US012025861B2

(12) United States Patent
Yu et al.

(10) Patent No.: US 12,025,861 B2
(45) Date of Patent: Jul. 2, 2024

(54) OPTOELECTRONIC DEVICE AND METHOD

(71) Applicant: ROCKLEY PHOTONICS LIMITED, Altrincham (GB)

(72) Inventors: Guomin Yu, Pasadena, CA (US); Aaron John Zilkie, Pasadena, CA (US)

(73) Assignee: Rockley Photonics Limited, Altrincham (GB)

( * ) Notice: Subject to any disclaimer, the term of this patent is extended or adjusted under 35 U.S.C. 154(b) by 306 days.

(21) Appl. No.: 17/417,296

(22) PCT Filed: Dec. 18, 2019

(86) PCT No.: PCT/EP2019/085938
§ 371 (c)(1),
(2) Date: Jun. 22, 2021

(87) PCT Pub. No.: WO2020/136054
PCT Pub. Date: Jul. 2, 2020

(65) Prior Publication Data
US 2022/0075213 A1 Mar. 10, 2022

Related U.S. Application Data

(60) Provisional application No. 62/784,632, filed on Dec. 24, 2018.

(51) Int. Cl.
*G02B 6/42* (2006.01)
*G02B 6/12* (2006.01)
(Continued)

(52) U.S. Cl.
CPC ..... *G02F 1/01708* (2013.01); *G02B 6/12004* (2013.01); *G02B 6/136* (2013.01); *G02B 6/4204* (2013.01); *G02B 2006/12061* (2013.01)

(58) Field of Classification Search
CPC .................................................. G02B 6/4204
See application file for complete search history.

(56) References Cited

U.S. PATENT DOCUMENTS

| 4,286,838 A | * | 9/1981 | Huignard | G02B 6/30 |
| | | | | 372/50.1 |
| 4,740,976 A | * | 4/1988 | Kajimura | H01S 5/34313 |
| | | | | 372/45.01 |

(Continued)

FOREIGN PATENT DOCUMENTS

| GB | 2 350 719 A | 12/2000 |
| GB | 2575167 B | 1/2020 |
| WO | WO 00/73828 A1 | 12/2000 |

OTHER PUBLICATIONS

International Search Report and Written Opinion of the International Searching Authority, dated Apr. 21, 2020, Corresponding to PCT/EP2019/085938, 8 pages.

(Continued)

*Primary Examiner* — Charlie Y Peng
(74) *Attorney, Agent, or Firm* — Lewis Roca Rothgerber Christie LLP

(57) ABSTRACT

An optoelectronic device. The device comprising: a multi-layered optically active stack, including one or more layers comprising a III-V semiconductor material; an input waveguide, arranged to guide light into the stack; and an output waveguide, arranged to guide light out of the stack. The multi-layered optically active stack is butt or edge coupled to the input waveguide and output waveguide.

16 Claims, 31 Drawing Sheets

(51) Int. Cl.
*G02B 6/136* (2006.01)
*G02F 1/017* (2006.01)

(56) References Cited

U.S. PATENT DOCUMENTS

| | | | | |
|---|---|---|---|---|
| 4,914,667 | A | * | 4/1990 | Blonder ............... G02B 6/423 257/713 |
| 5,381,434 | A | * | 1/1995 | Bhat ................ H01S 5/34313 372/45.011 |
| 5,754,714 | A | | 5/1998 | Suzuki et al. |
| 10,809,547 | B2 | * | 10/2020 | Yu ........................... G02F 1/017 |
| 2002/0167981 | A1 | * | 11/2002 | Eisenbeiser ....... H01L 21/02381 257/E21.12 |
| 2004/0165812 | A1 | * | 8/2004 | Blauvelt .............. G02B 6/4204 385/129 |
| 2013/0051727 | A1 | * | 2/2013 | Mizrahi ................ H01S 5/3013 385/28 |
| 2021/0181437 | A1 | * | 6/2021 | Yu ......................... H01S 5/0234 |

OTHER PUBLICATIONS

U.K. Intellectual Property Office Examination Report, dated Feb. 23, 2022, for Patent Application No. GB2110172.0, 3 pages.
U.K. Intellectual Property Office Search and Examination Report, dated Sep. 6, 2022, for Patent Application No. GB2110172.0, 3 pages.
Chinese Notification of the First Office Action, for Patent Application No. 201980092840.6, dated Nov. 28, 2023, 4 pages.
Partial English Translation of the Chinese Notification of the First Office Action, for Patent Application No. 201980092840.6, dated Nov. 28, 2023, 5 pages.
Partial English Translation of the Chinese Notification of the First Office Action, for Patent Application No. 201980092840.6, mailed Nov. 28, 2023, 11 pages.

* cited by examiner

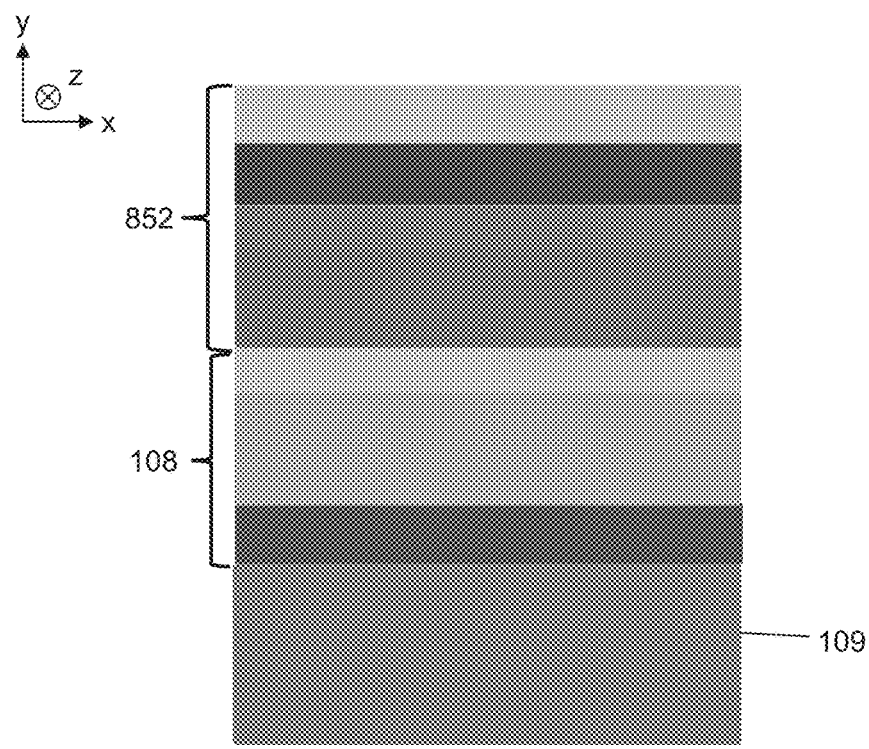
Fig. 11(iii)

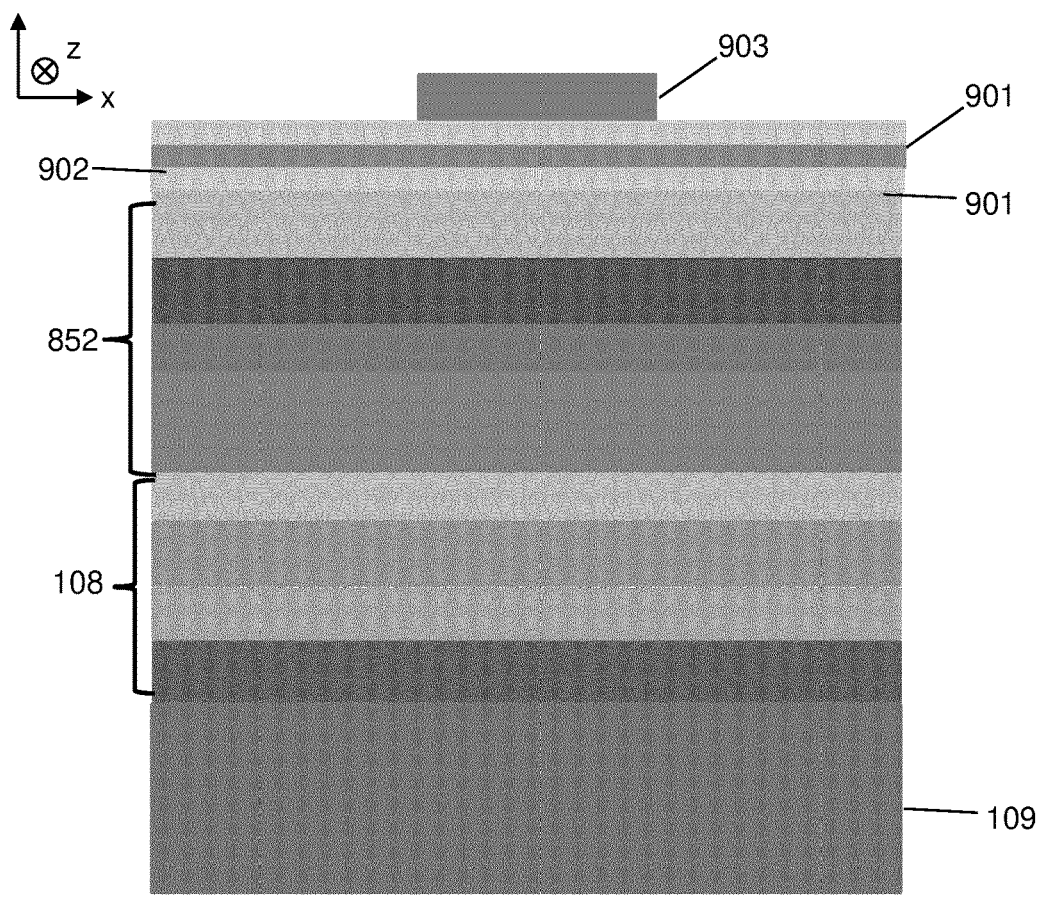
Fig. 11(v)(A)
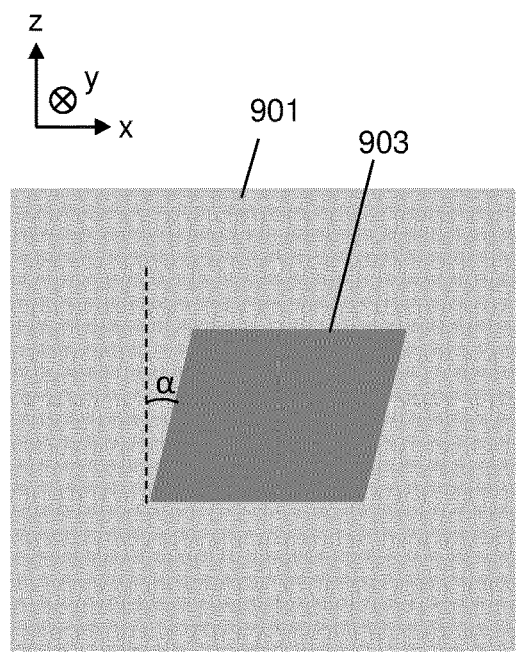 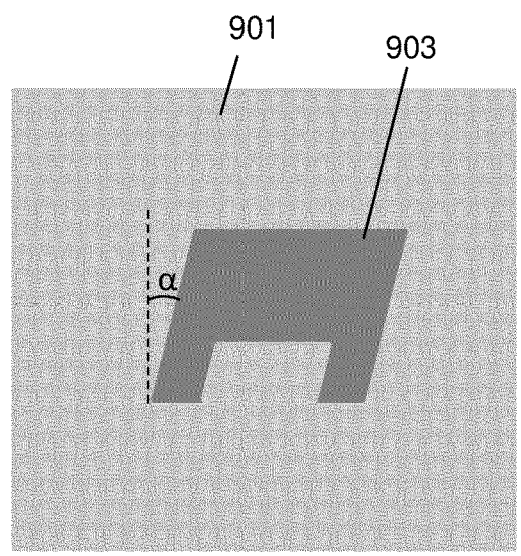
Fig. 11(v)(B)　　　Fig. 11(v')(B)

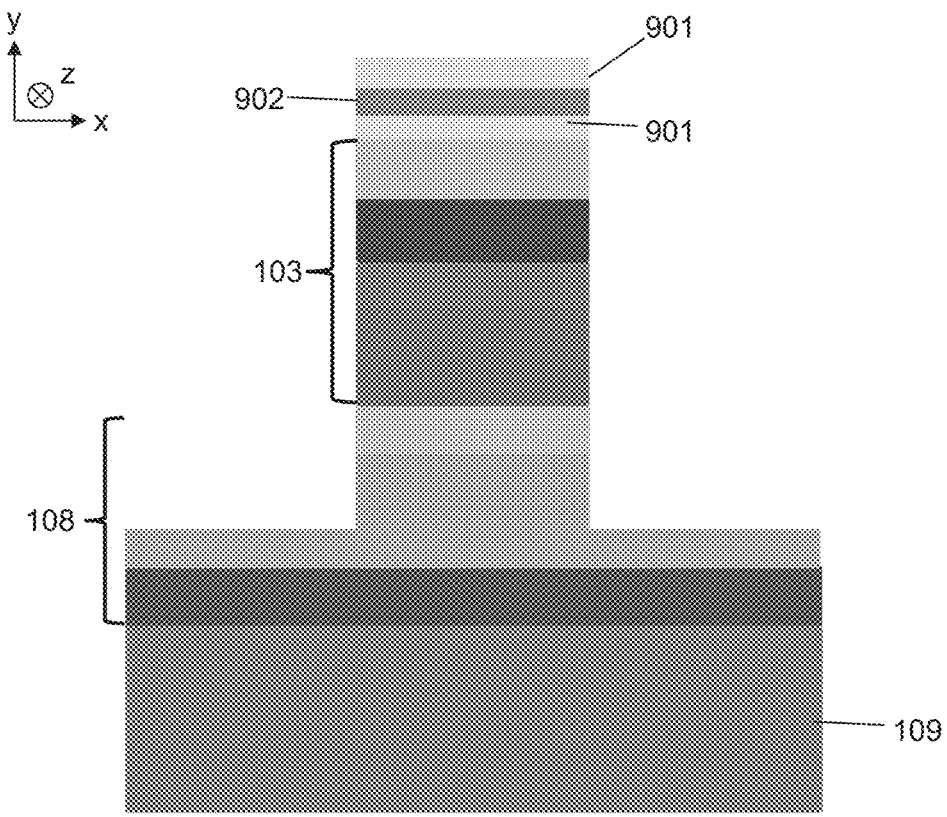
Fig. 11(vi)(A)
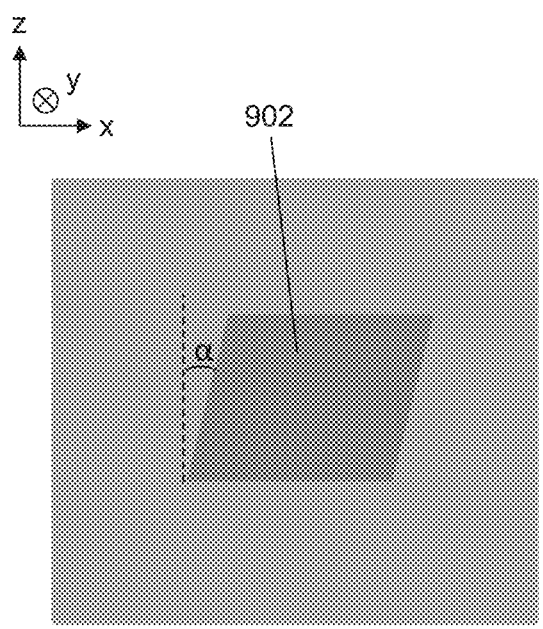
Fig. 11(vi)(B)
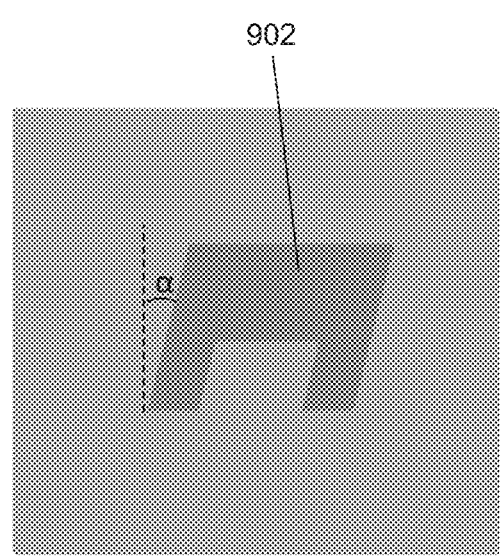
Fig. 11(vi')(B)

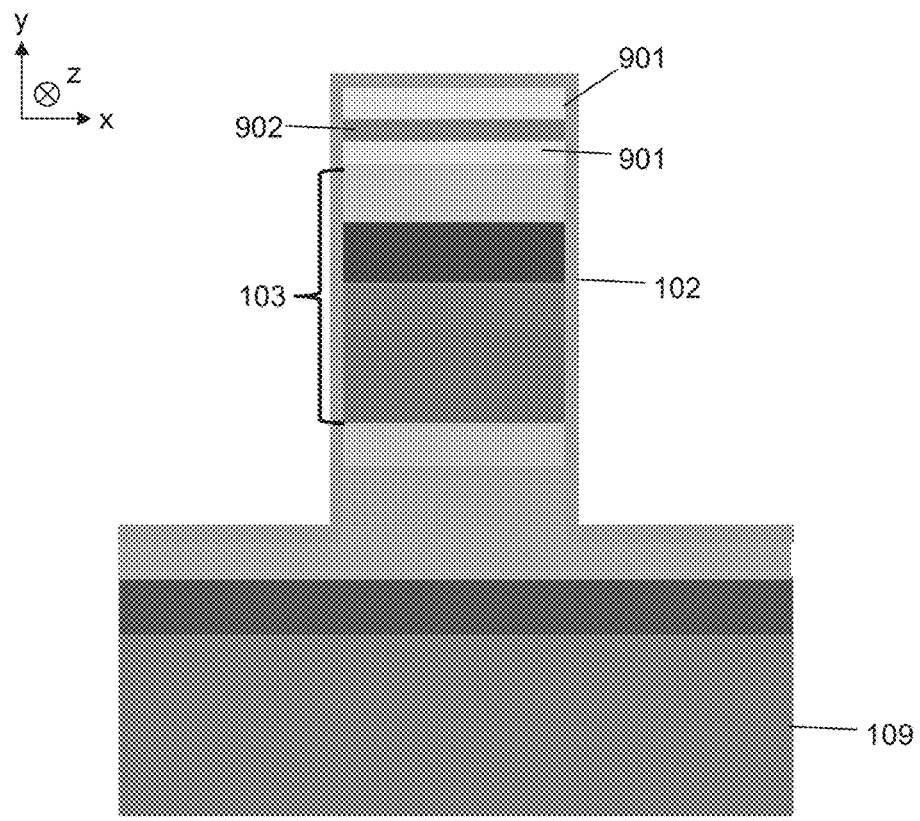
Fig. 11(vii)
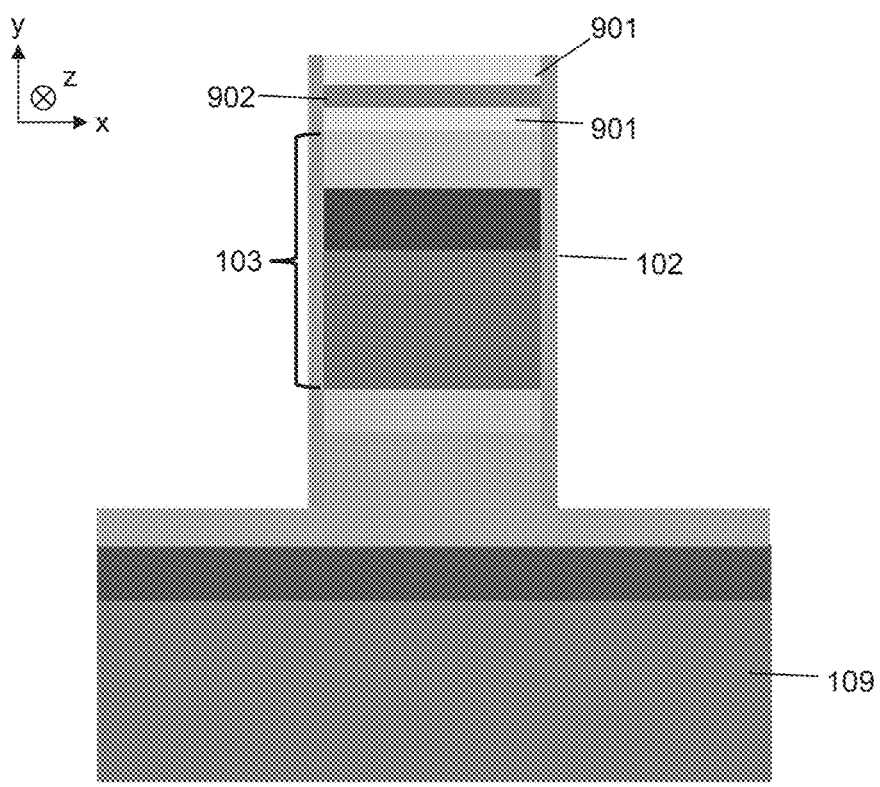
Fig. 11(viii)

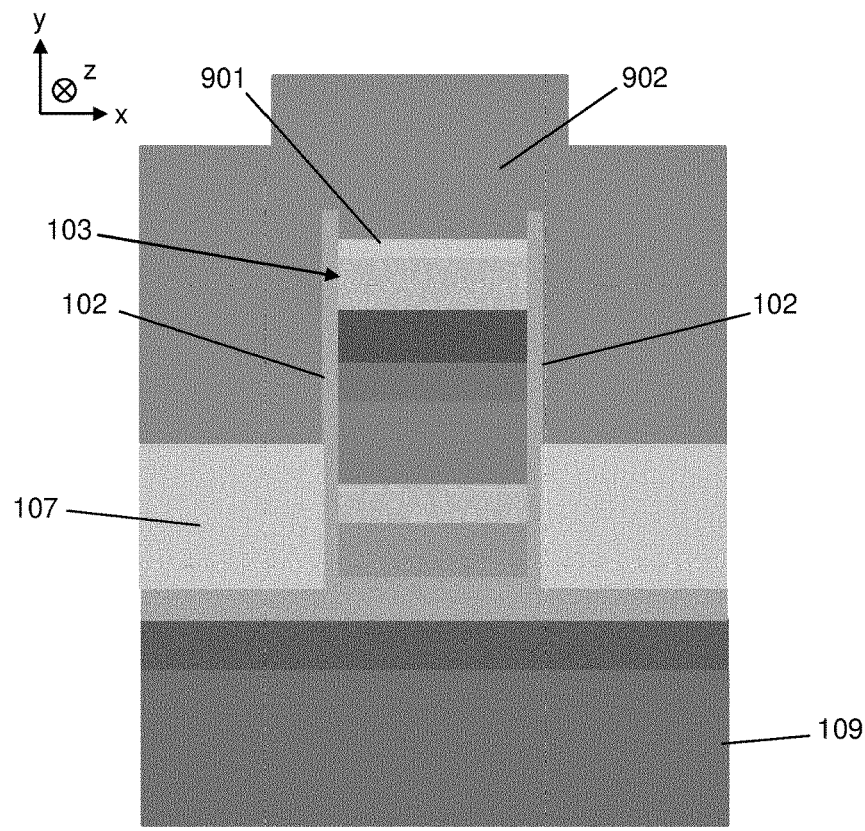
Fig. 11(xii)

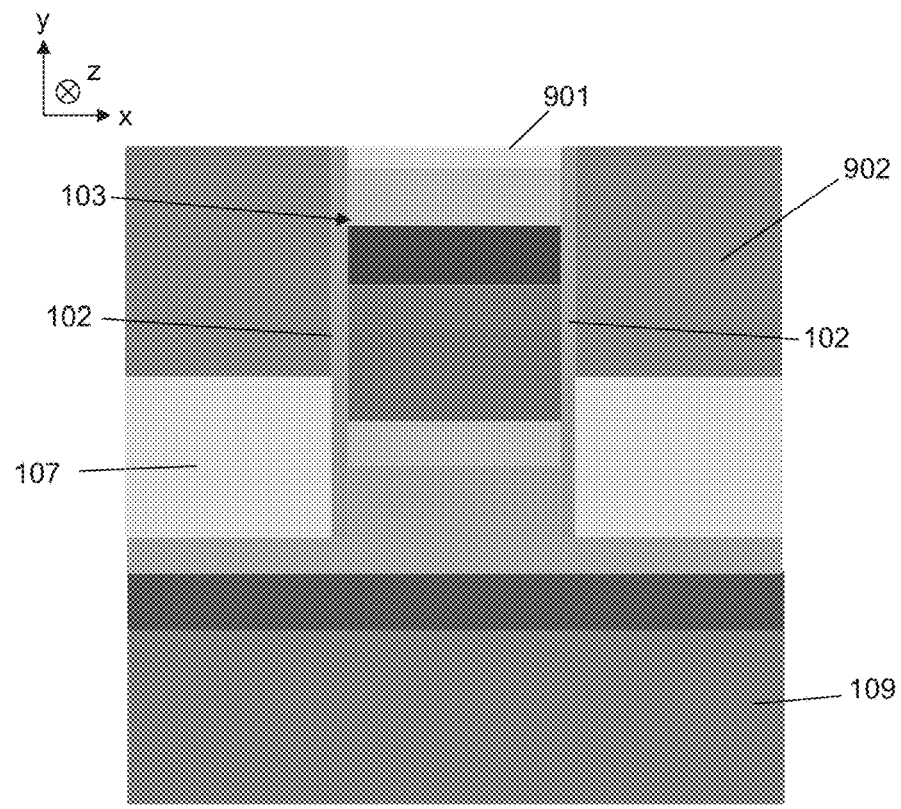
Fig. 11(xiii)
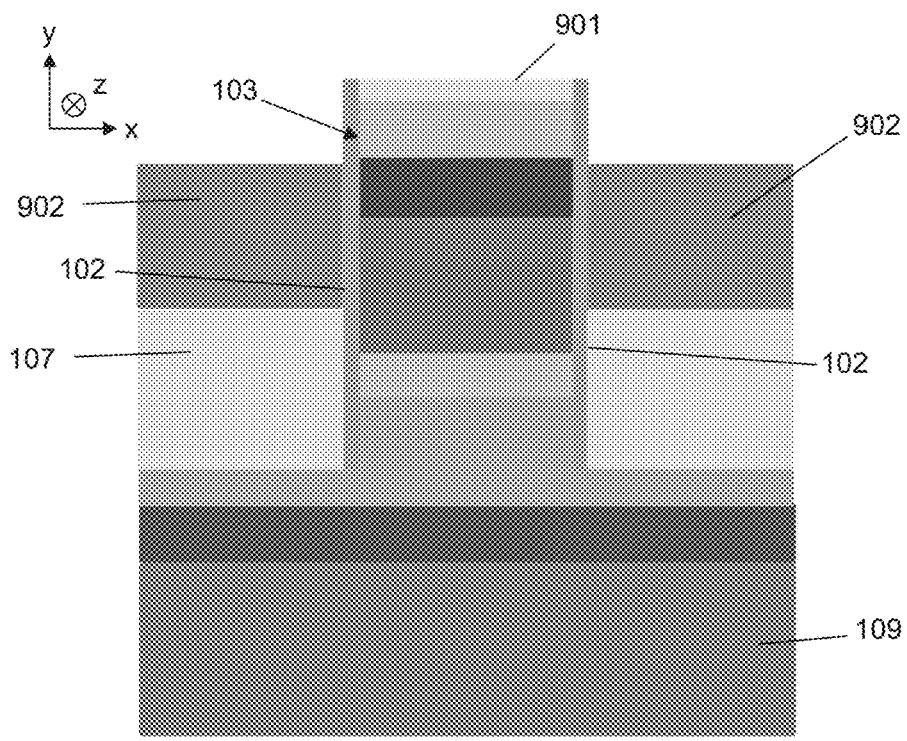
Fig. 11(xiv)

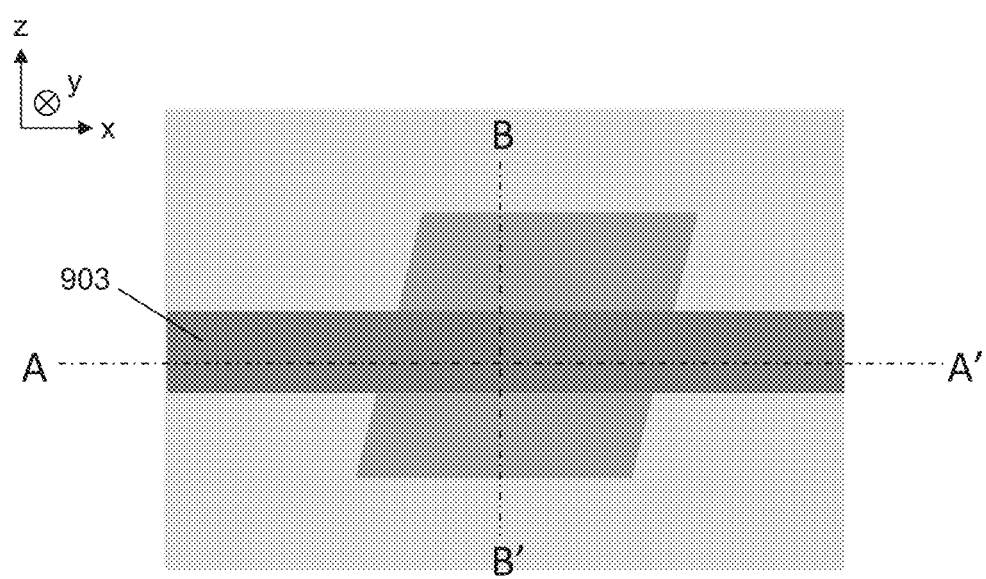
Fig. 11(xvi)

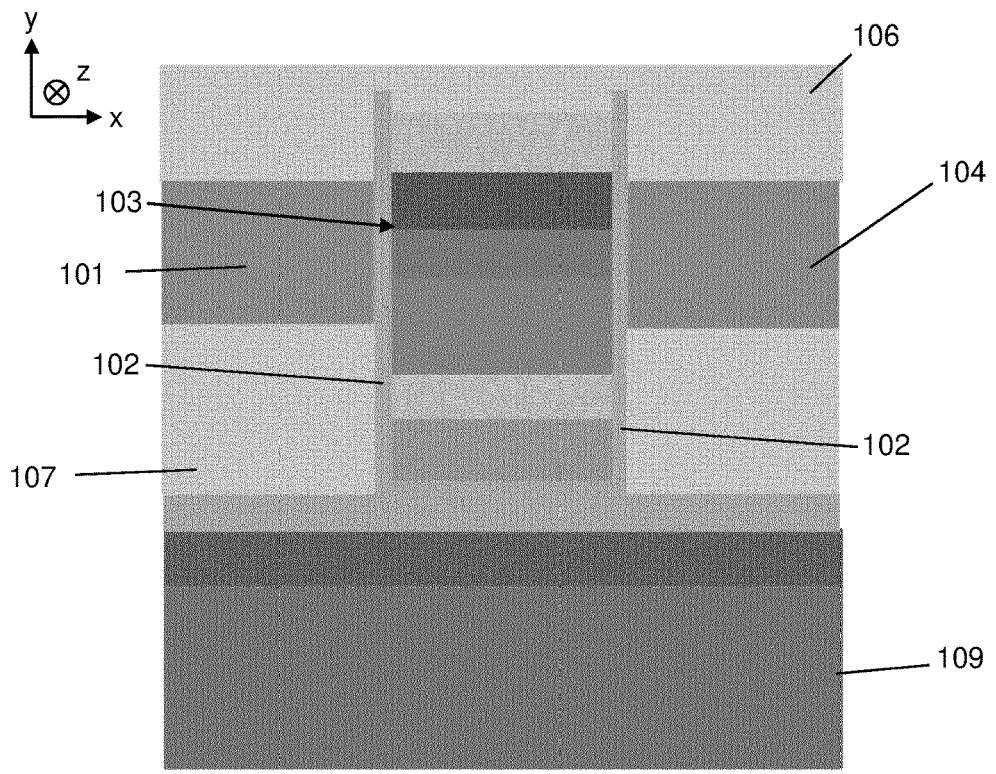
Fig. 11(xvii)(A)
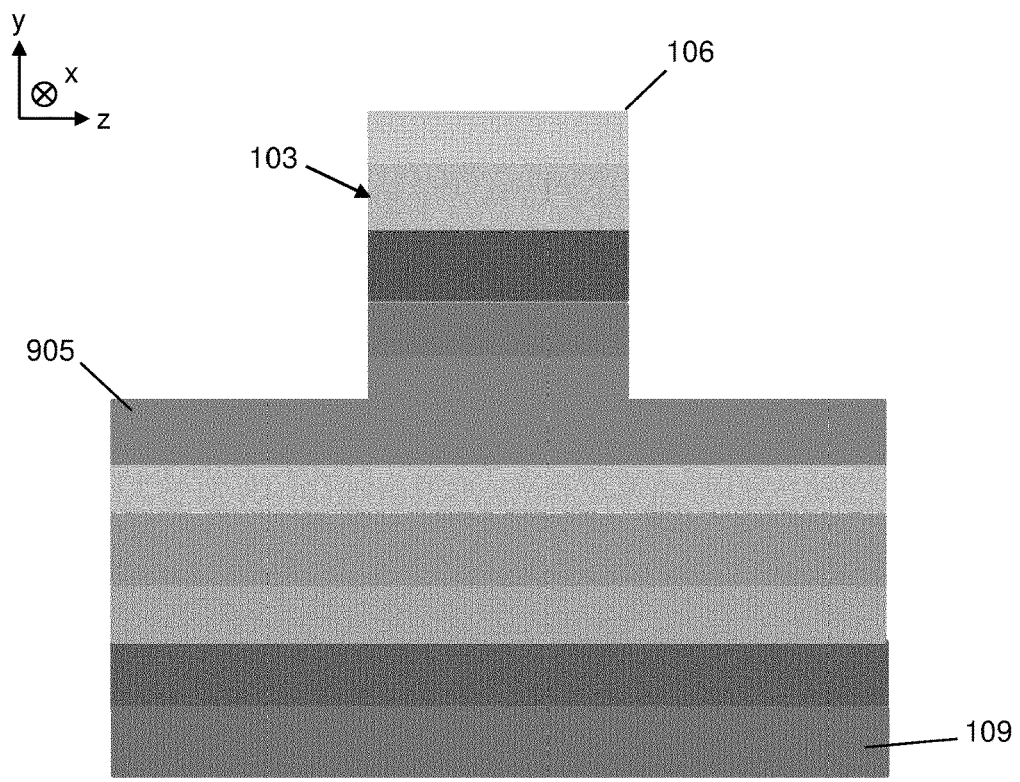
Fig. 11(xvii)(B)

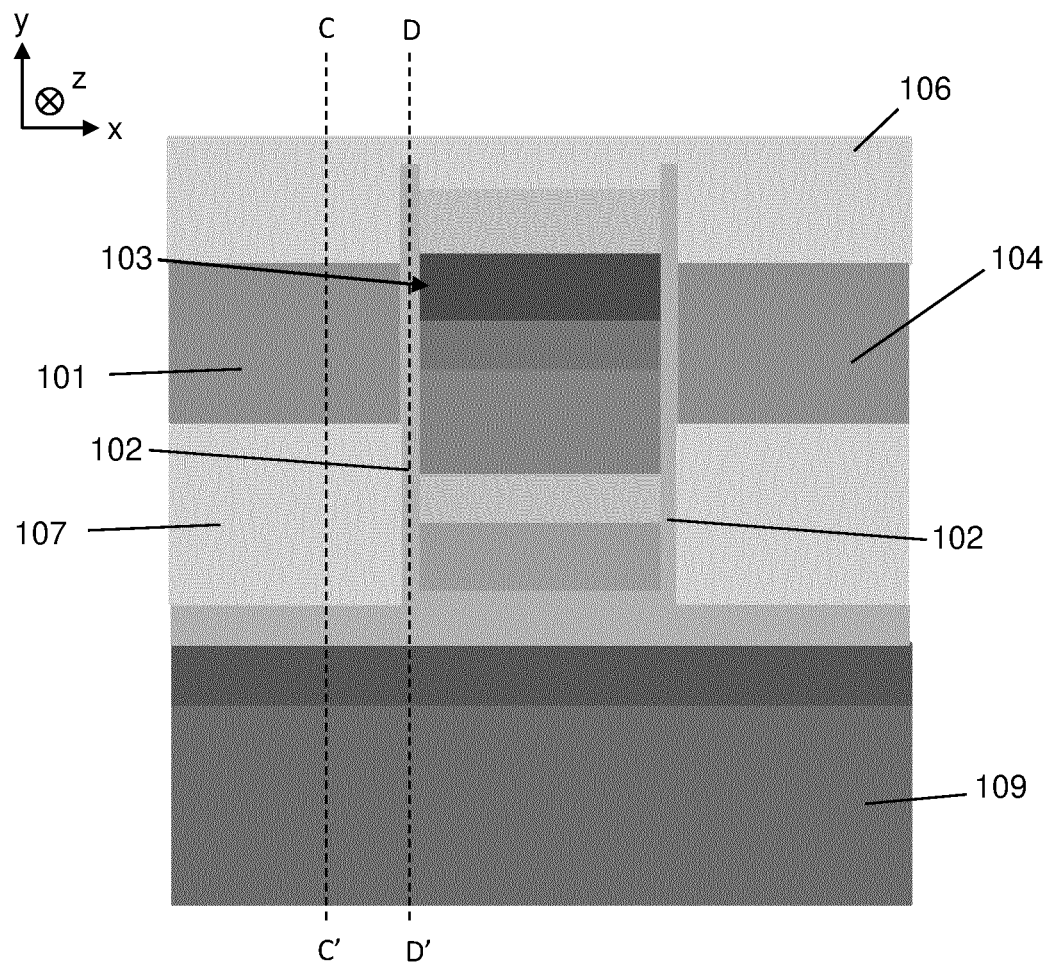
Fig. 11(xvii)(C)
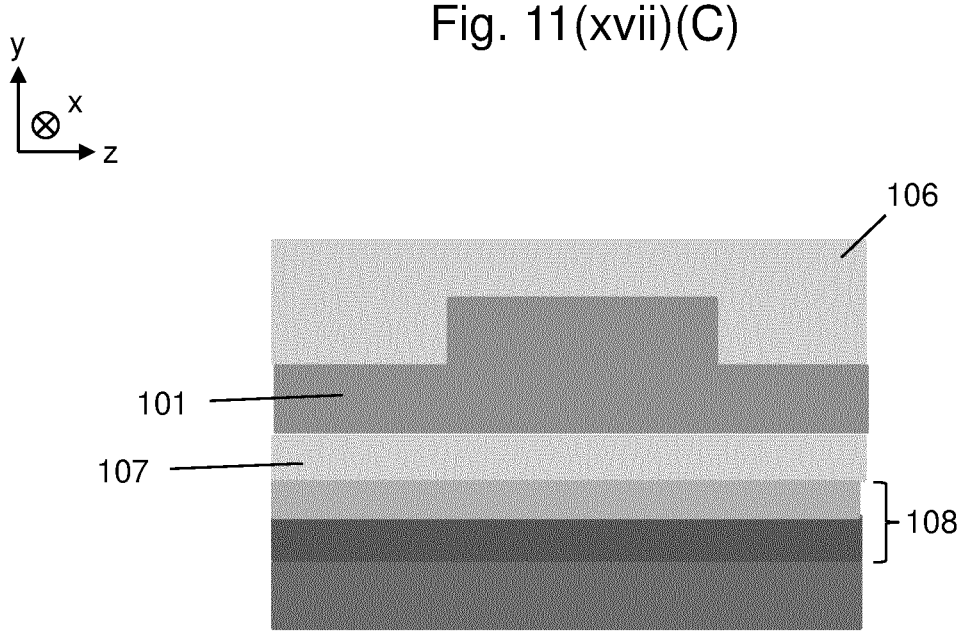
Fig. 11(xvii)(D)

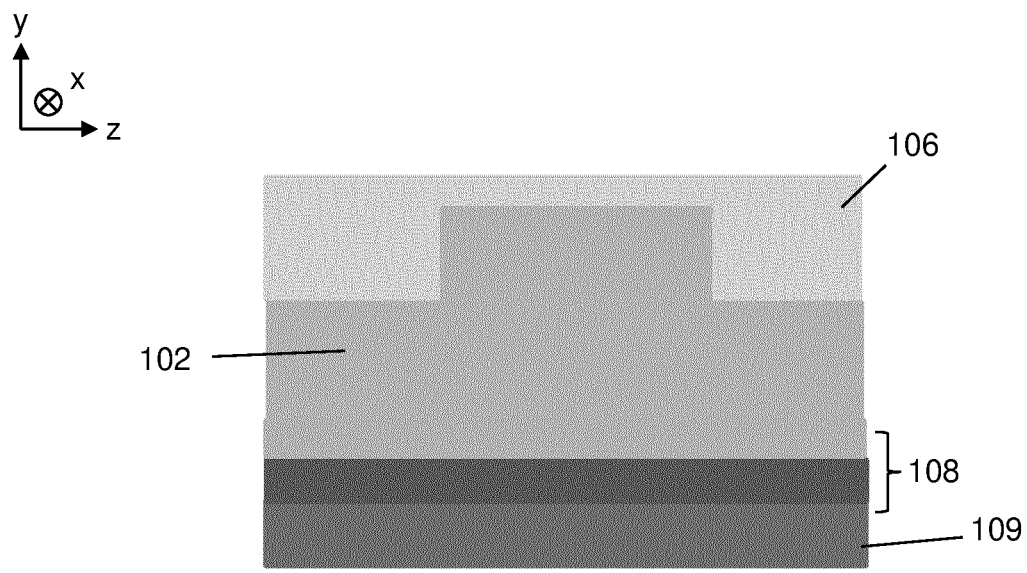
Fig. 11(xvii)(E)
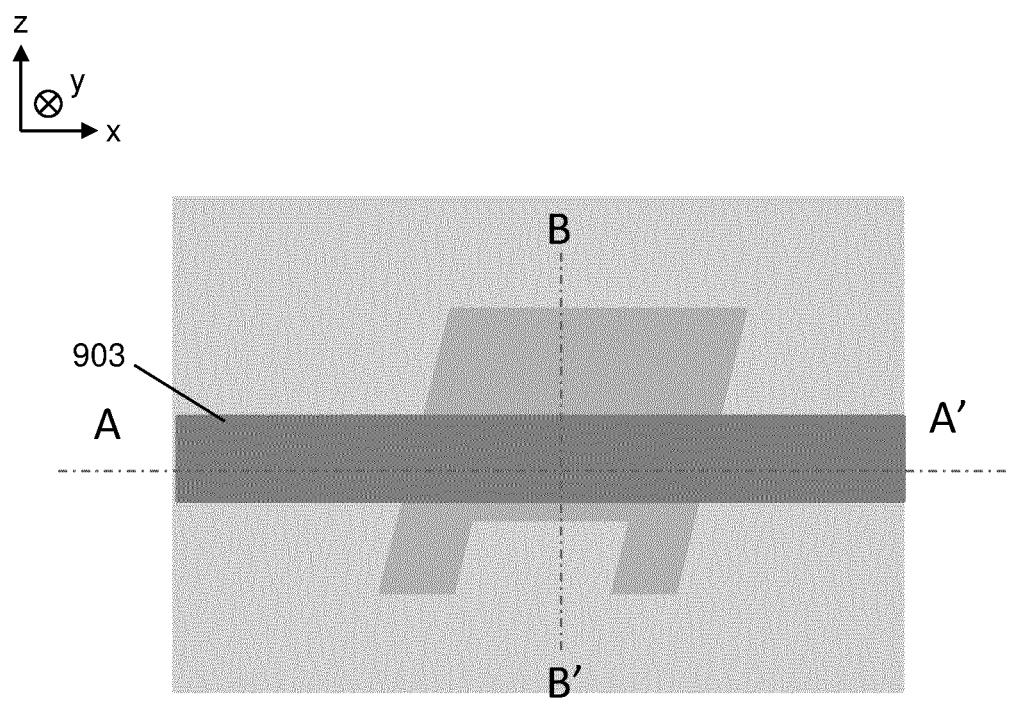
Fig. 11(xvii')

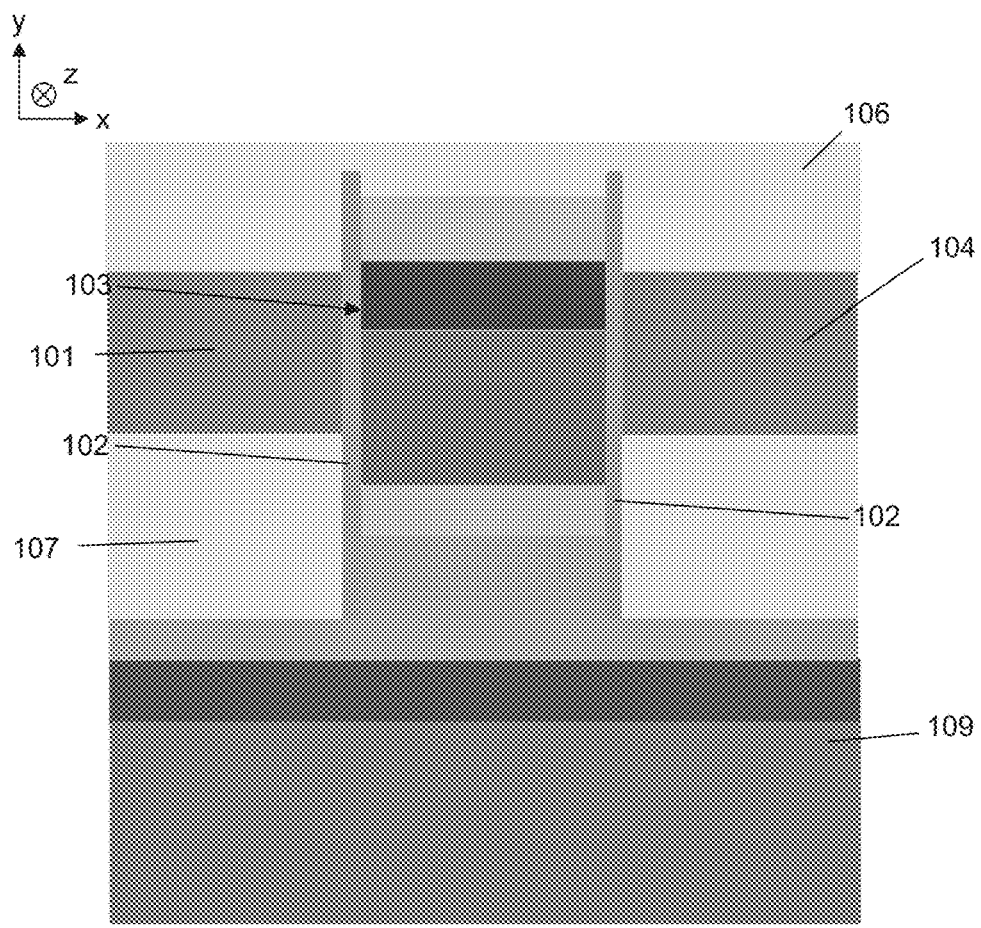
Fig. 11(xvii')(A)
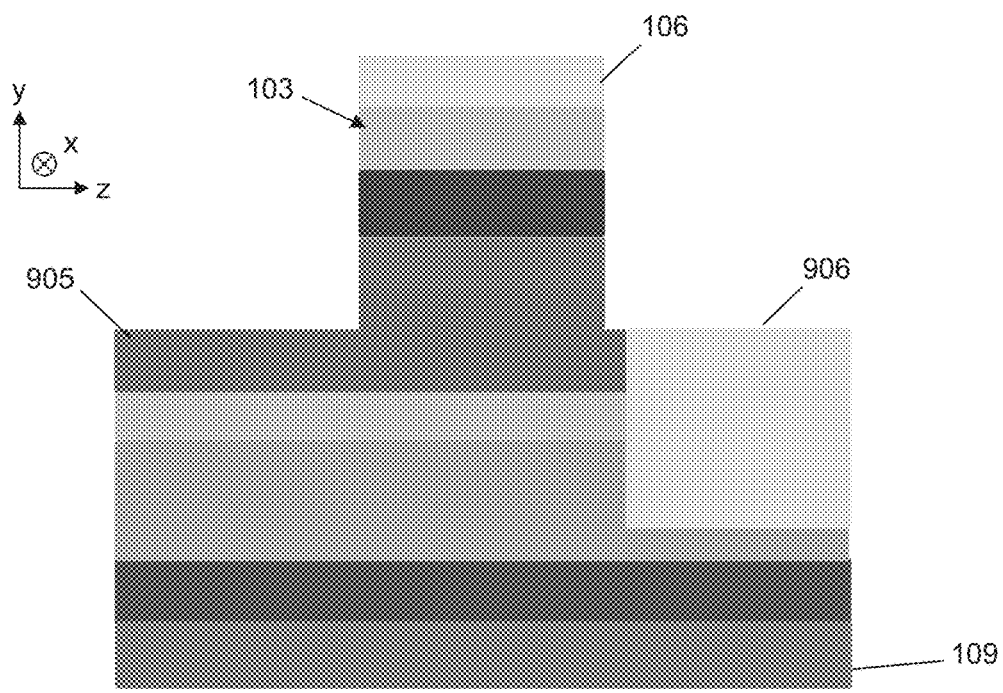
Fig. 11(xvii')(B)

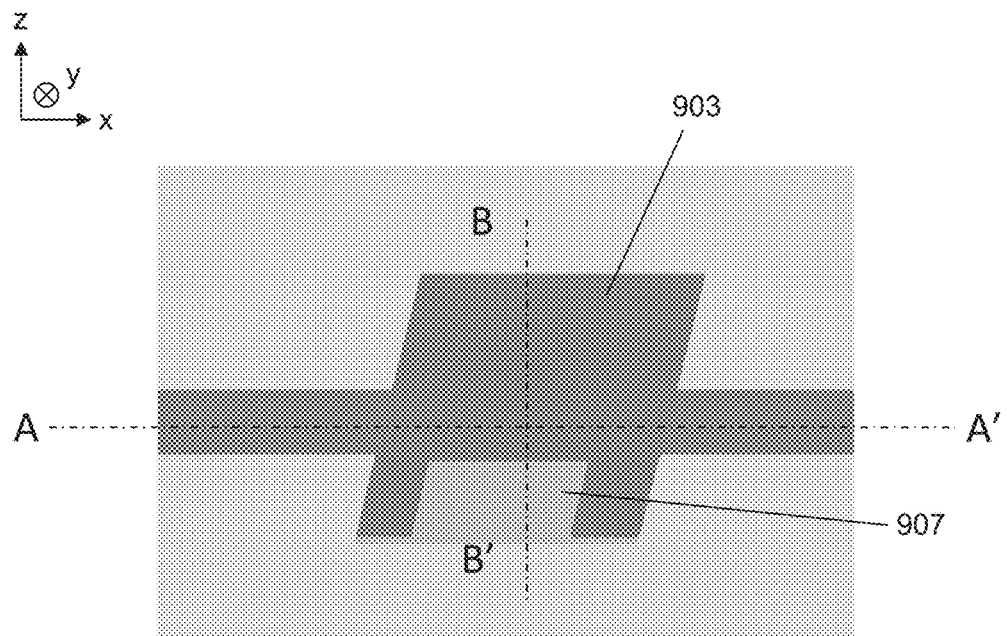
Fig. 11(xviii)
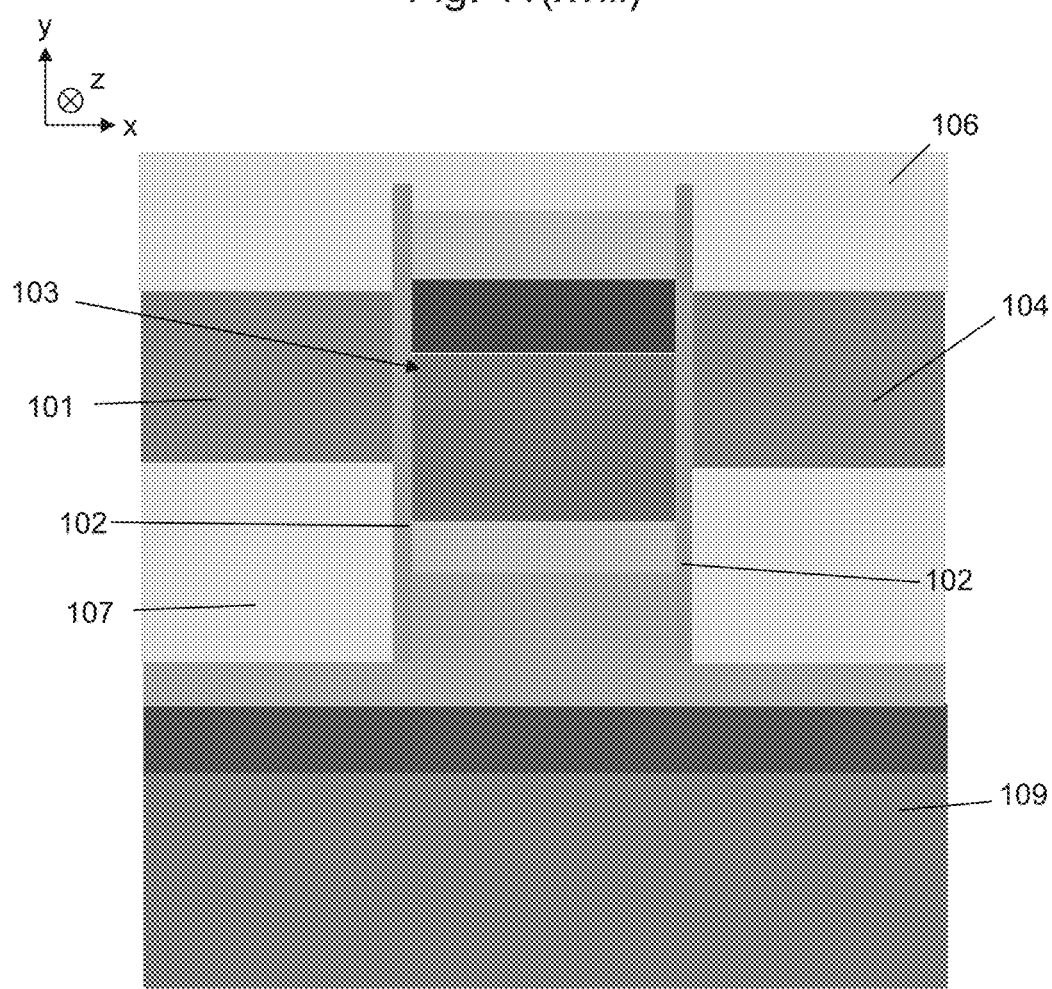
Fig. 11(xviii)(A)

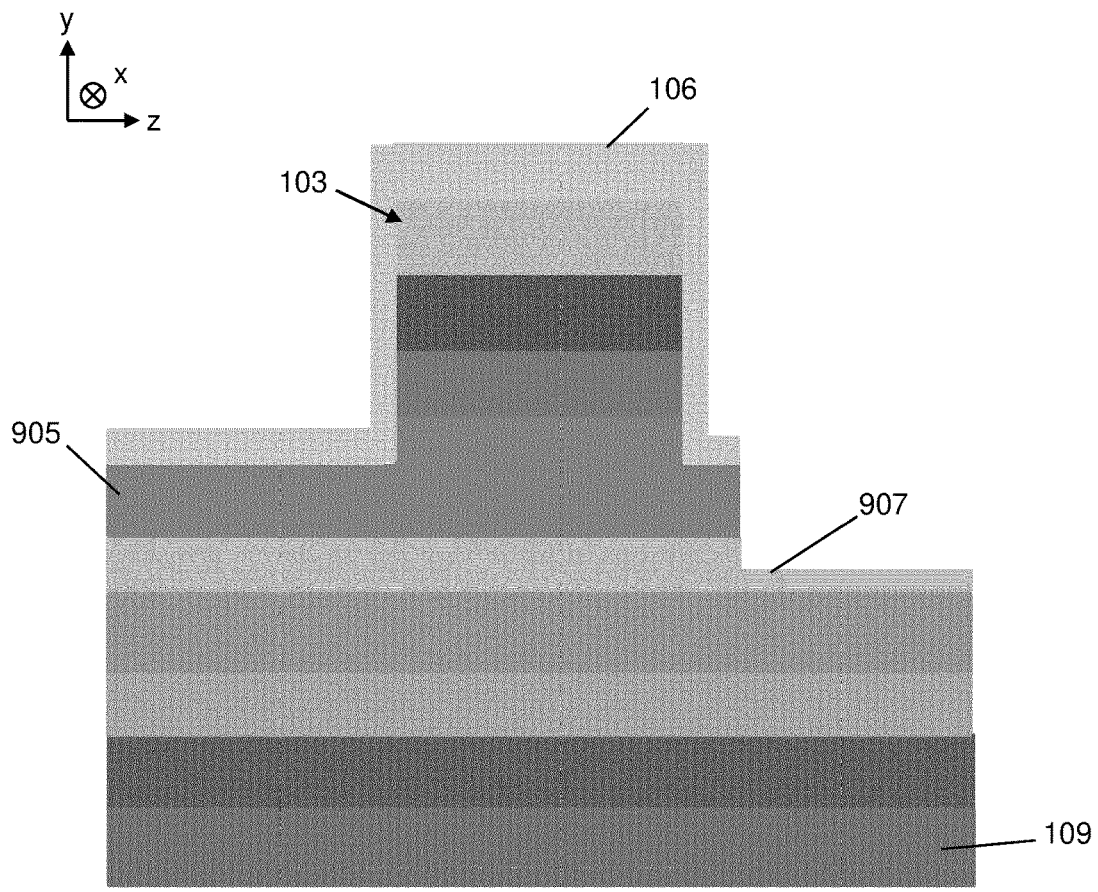
Fig. 11(xviii)(B)
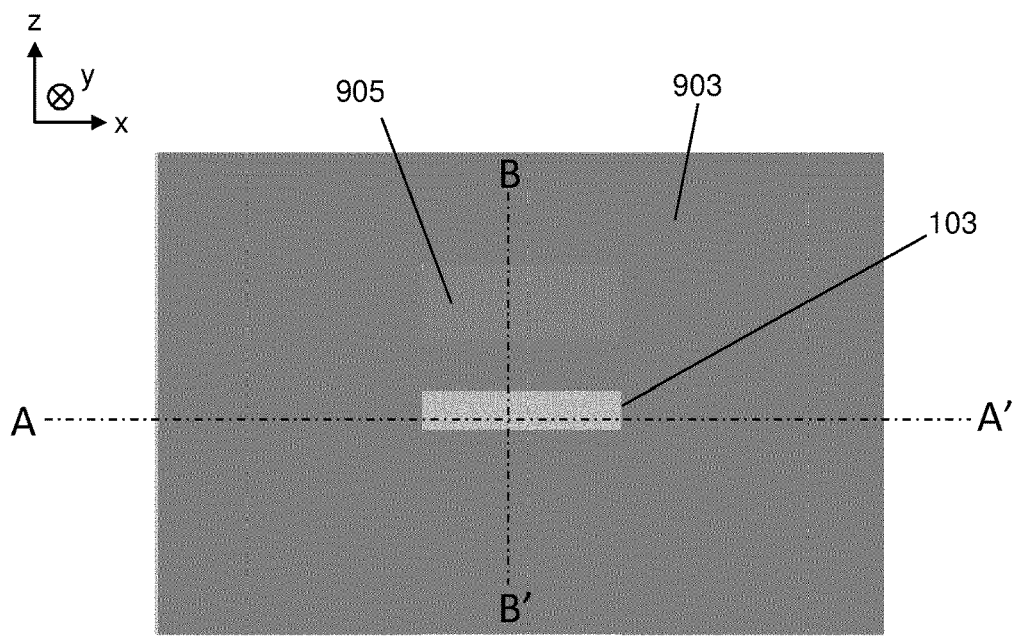
Fig. 11(xix)

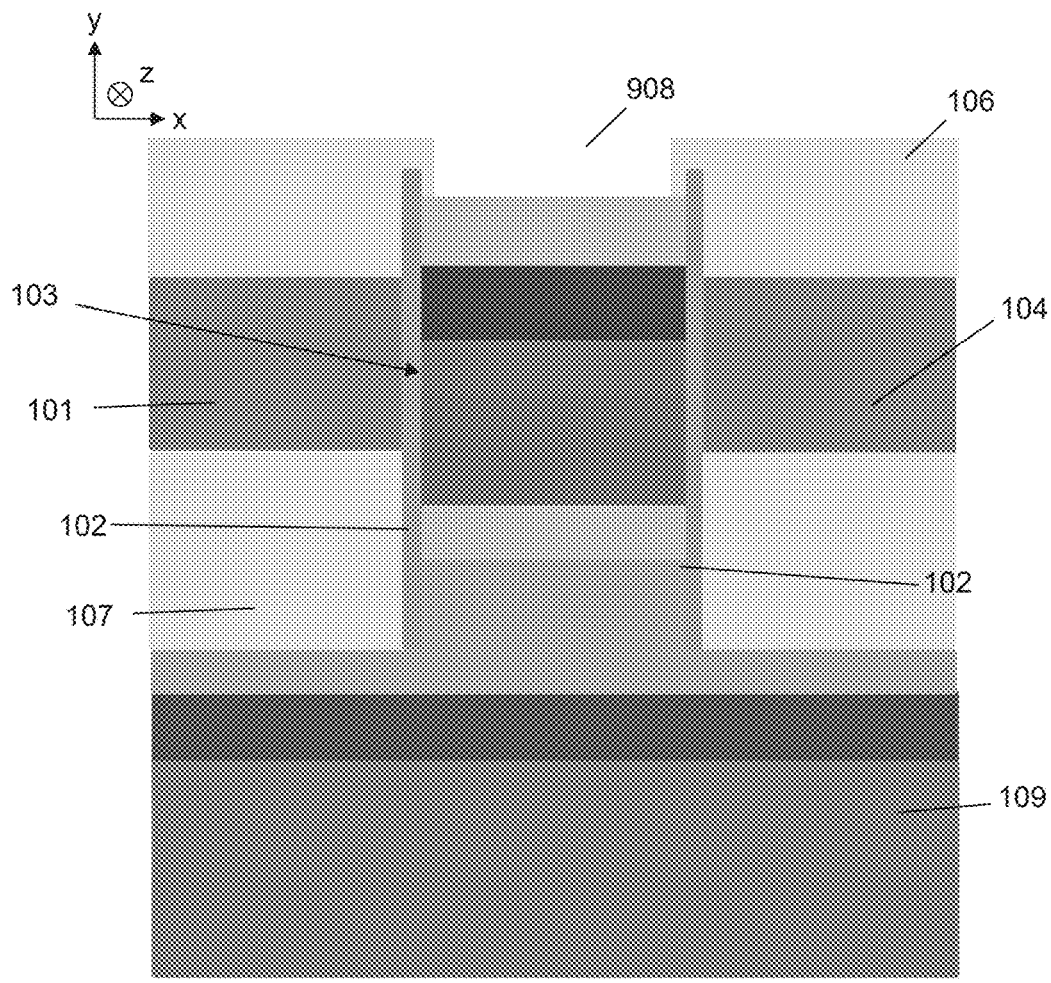
Fig. 11(xix)(A)
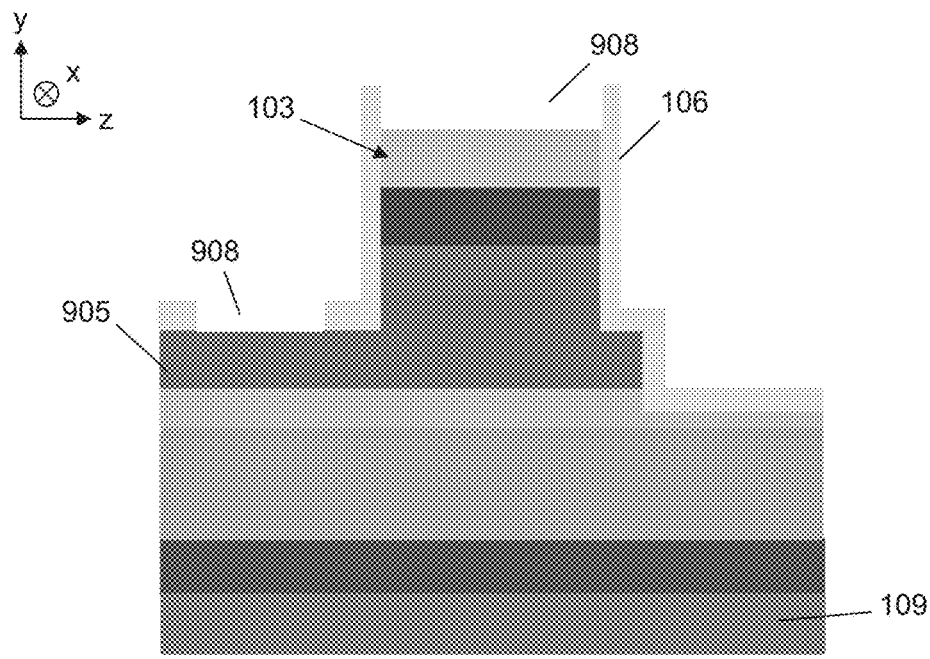
Fig. 11(xix)(B)

Fig. 11(xix')(B)

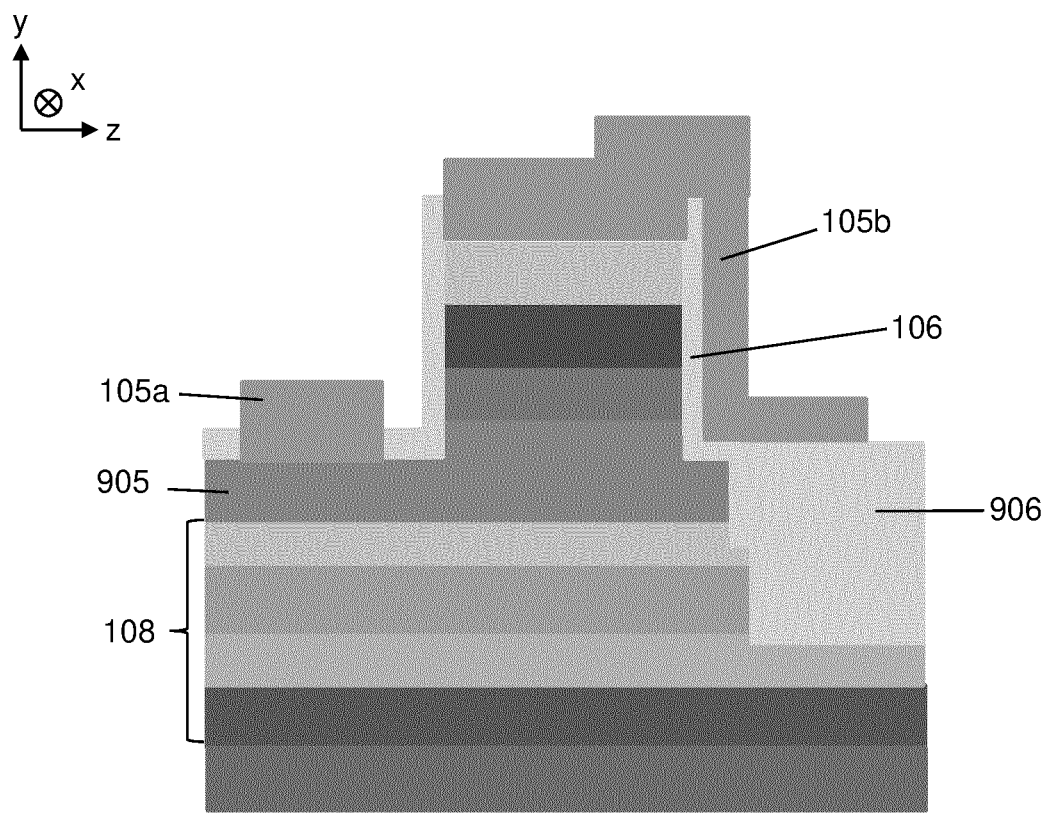
Fig. 11(xx')(B)

OPTOELECTRONIC DEVICE AND METHOD

CROSS-REFERENCE TO RELATED APPLICATION(S)

This application is a national stage entry, under 35 U.S.C. § 371, of International Application Number PCT/EP2019/085938, filed on Dec. 18, 2019, which claims priority to and the benefit of U.S. Provisional Patent Application No. 62/784,632, filed Dec. 24, 2018. The entire contents of all of the applications identified in this paragraph are incorporated herein by reference.

The present invention relates to an optoelectronic device and a method of forming an optoelectronic device.

The integration of silicon-based waveguide technologies with III-V semiconductors provides the benefits of both materials systems. Namely, the high speed nature of III-V semiconductors and the manufacturability and stability of silicon-based waveguide technologies.

However, it has proven technically challenging to integrate III-V semiconductors with silicon waveguides. Typically poor integration leads to significant optical losses.

There is a need then for an optoelectronic device and a method of manufacture thereof which integrates silicon-based waveguide technologies and III-V semiconductors whilst also not incurring unacceptable optical losses.

Accordingly, in a first aspect, embodiments of the present invention provide an optoelectronic device comprising:
  a multi-layered optically active stack, including one or more layers comprising a III-V semiconductor material;
  an input waveguide, arranged to guide light into the stack; and
  an output waveguide, arranged to guide light out of the stack;
  wherein the multi-layered optically active stack is butt or edge coupled to the input waveguide and output waveguide.

Advantageously, such an optoelectronic device demonstrates lower optical losses.

The optoelectronic may have any one or, to the extent that they are compatible, any combination of the following optional features.

The optoelectronic device may include a silicon substrate, located beneath the multi-layered optically active stack.

The input waveguide and output waveguide may be formed from silicon nitride. This can further decrease the optical losses of the device.

The device may further comprise a first anti-reflective coating, located between the input waveguide and the multi-layered optically active stack, and the input waveguide may be directly adjacent to the first anti-reflective coating and the first anti-reflective coating may be directly adjacent to the multi-layered optically active stack.

The device may further comprise a second anti-reflective coating, located between the output waveguide and the multi-layered optically active stack, and the output waveguide may be directly adjacent to the second anti-reflective coating and the second anti-reflective coating may be directly adjacent to the multi-layered optically active stack. The first and/or the second anti-reflective coating(s) may be formed of a composition of silicon nitride with a refractive index which is greater than a refractive index of a silicon nitride core layer of either the input waveguide or the output waveguide. The refractive index of the first and/or the second anti-reflective coating may be at least 2.6 and no more than 2.85. The first and/or the second anti-reflective coating may have respective lengths, as measured parallel to a guiding direction of the input waveguide, of at least 90 nm and no more than 200 nm.

The multi-layered optically active stack may be directly adjacent to the input waveguide and the output waveguide.

A refractive index of a core layer of the input waveguide and the output waveguide may be at least 1.9 and no more than 2.35.

The multi-layered optically active stack may include a buffer region and an optically active region. The buffer region mitigates the lattice constant mismatch between the silicon and InP (or InGaAs) on which the multi-layered optically active stack is grown. The buffer region may include a crystalline rare oxide layer.

The device may further comprise an oxide cladding layer, the oxide cladding layer may be located directly between the input waveguide and either a buffer layer or a buried oxide layer.

The device may be an electro-absorption modulator (EAM). The EAM may utilize the Quantum Confined Stark Effect (QCSE) or Franz-Keldysh effect.

In a second aspect, embodiments of the present invention provide a method of forming an optoelectronic device, comprising the steps of:
  (a) blank growing a multi-layered optically active region on a substrate, wherein the multi-layered optically active region includes one or more layers formed of a III-V semiconductor based material;
  (b) patterning and etching the multi-layered optically active region, so as to provide a multi-layered optically active stack; and
  (c) depositing an input waveguide and output waveguide adjacent to the stack, arranged so as to butt or edge couple the input waveguide and the output waveguide to the multi-layered optically active stack.

Advantageously, such a method results in optoelectronic devices demonstrating lower optical losses.

The optoelectronic may have any one or, to the extent that they are compatible, any combination of the following optional features.

The input waveguide and output waveguide may be formed of silicon nitride.

The method may further comprise a step, between steps (b) and (c), of depositing an anti-reflective coating around at least a part of the stack. After depositing the anti-reflective coating, the method may include a step of etching the anti-reflective coating. The anti-reflective coating may be formed of a composition of silicon nitride with a refractive index greater than a refractive index of a silicon nitride core layer of either the input waveguide or the output waveguide. The method may further comprise, after etching the anti-reflective coating, a step of depositing bulk insulator onto the device. The method may further comprise, after depositing the bulk insulator, a step of etching the bulk insulator such that an upper surface of the bulk insulator is above the uppermost surface of a buffer layer of the optically active stack.

The step of blanket growing the multi-layered optically active region may include an initial step of growing a buffer region, and a subsequent step of growing an optically active region. The buffer region may include a crystalline rare earth oxide layer.

The method may further comprise, between steps (a) and (b), a step of depositing a multi-layer hard mask on top of an upper surface of the optically active stack. The multi-layer mask may comprise a silicon nitride layer and two insulator layers.

Patterning the optically active stack may include a step of depositing a photoresist over a portion of the upper surface of the optically active stack, which may be removed after the step of etching the optically active stack.

The substrate may be formed of silicon. The substrate may be a silicon-on-insulator layer of a silicon-on-insulator wafer.

The device may be an electro-absorption modulator (EAM). The EAM may utilize the Quantum Confined Stark Effect (QCSE) or Franz-Keldysh effect.

Further aspects of the present invention provide: a computer program comprising code which, when run on a computer, causes the computer to perform the method of the second aspect; a computer readable medium storing a computer program comprising code which, when run on a computer, causes the computer to perform the method of the second aspect; and a computer system programmed to perform the method of the second aspect.

BRIEF DESCRIPTION OF THE DRAWINGS

Embodiments of the invention will now be described by way of example with reference to the accompanying drawings in which.

DETAILED DESCRIPTION AND FURTHER OPTIONAL FEATURES

Aspects and embodiments of the present invention will now be discussed with reference to the accompanying figures. Further aspects and embodiments will be apparent to those skilled in the art.

Figure 1:
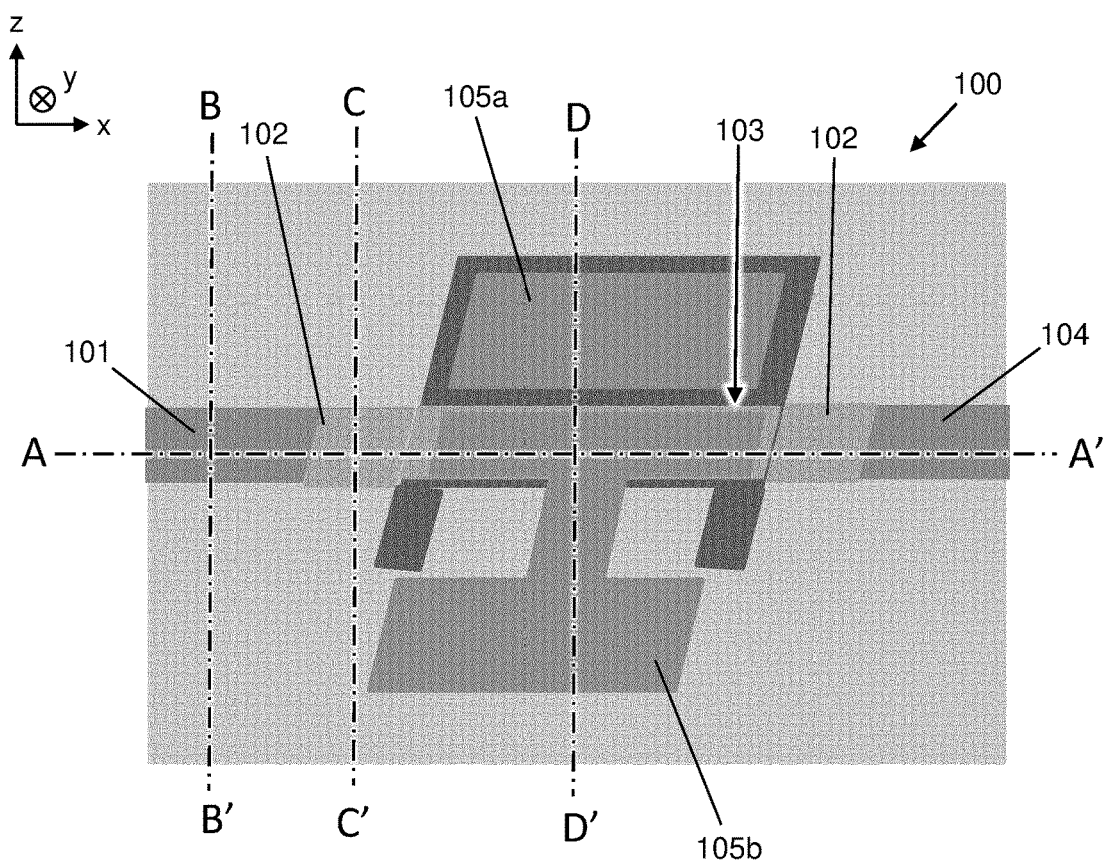
FIG. 1 shows a top-down schematic view of an optoelectronic device according to an embodiment of the present invention.

FIG. 1 shows a top-down schematic view of an optoelectronic device 100 according to an embodiment of the present invention. The device includes an input waveguide 101, in this example formed of Silicon Nitride (SiN). The input waveguide is coupled to an antireflective coating 102, in this example also formed of SiN but with a different composition. The antireflective coating is then coupled to a multi-layered optically active stack 103, including one or more layers formed of a III-V semiconductor. The multi-layered optically active stack is usable to modulate an optical signalling passing therethrough, in a manner discussed in more detail below. The multi-layered optically active stack is coupled at an opposing end to a further anti-reflective coating 102, which is coupled to an output waveguide 104. The output waveguide and anti-reflective coating are also formed of SiN.

The device 100 includes a first electrode 105a and second electrode 105b, which can be connected to an electronic driver and used to impart modulation signals on an optical signal present in the multi-layered optically active stack. The electrodes are, in this example, formed from aluminium.

Figure 2A:
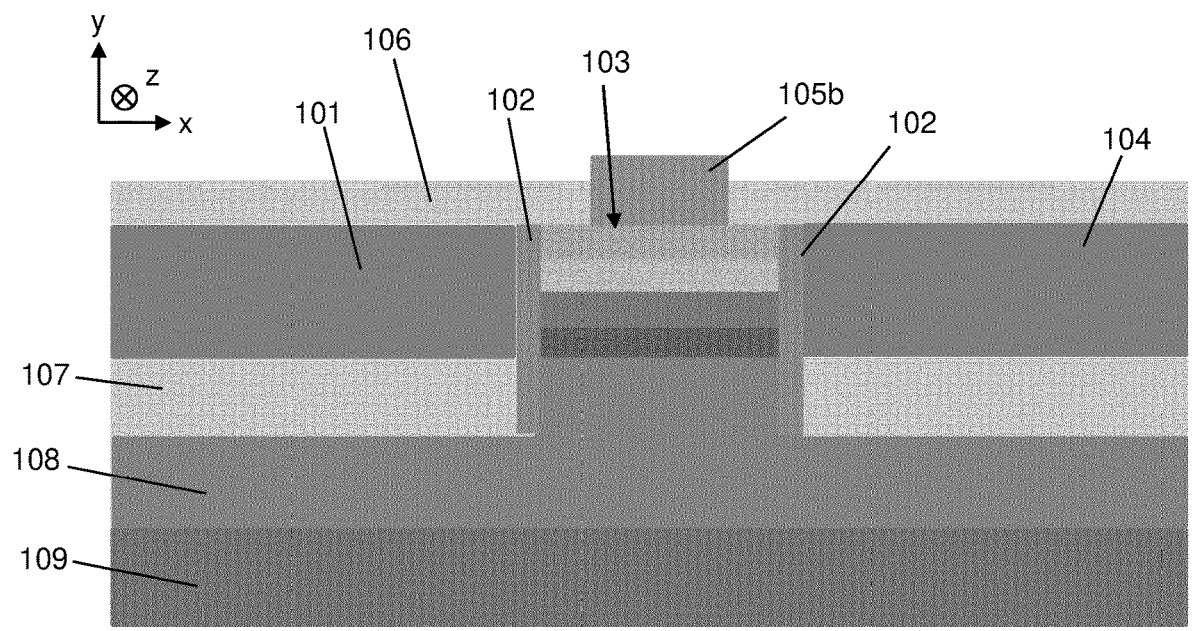
FIG. 2A is a cross-sectional view of the device of FIG. 1 along the line A-A'.

FIG. 2A is a cross-sectional view of the device 100 of FIG. 1 along the line A-A'. As can be seen in more detail, the anti-reflective coatings extend up opposite lateral sides of the multi-layered optically active stack. Also of note is the buffer layer 108, which is adjacent to a silicon substrate 109 and located between the silicon substrate and the multi-layered optically active stack 103. The buffer layers function to mitigate the lattice constant mismatch between the silicon substrate and the bottom layer of the multi-layer optically active stack to provide a better crystalline quality to the multi-layered optically active stack and so to lower crystalline defects. Also shown in this view are upper cladding layer 106 and lower cladding layer 107, which clad both the input 101 and output 104 waveguides. The cladding layers are, in this example, formed from silicon dioxide ($SiO_2$).

In use, light enters the device 100 into the input waveguide 101. It is then guided along 'x' direction through the input waveguide and is then coupled into the multi-layered optically active stack 103 via the antireflective coating 102.

A modulation signal may then be applied, for example to modifying the phase or amplitude of the signal, before it is then coupled out of the multi-layered optically active stack 103 and into the output waveguide 104 via a further antireflective coating 102.

Figure 2B:
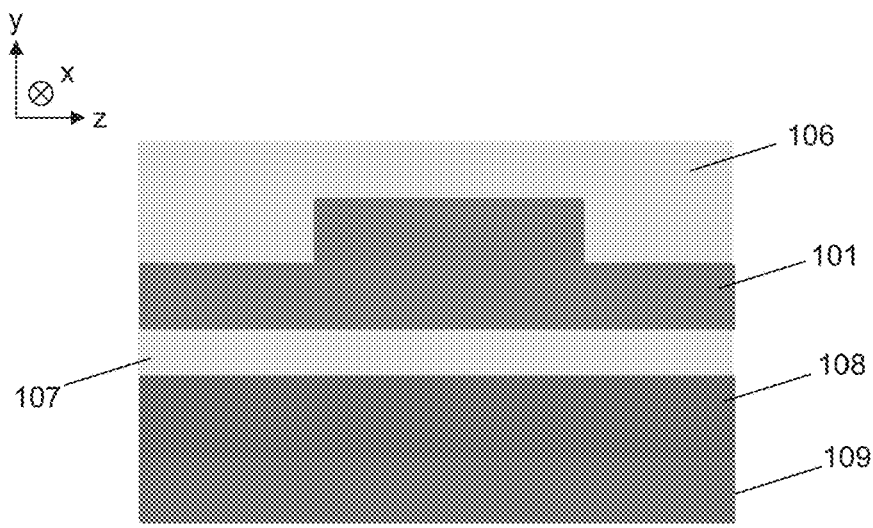
FIG. 2B is a cross-sectional view of the device of FIG. 1 along the line B-B'.

FIG. 2B is a cross-sectional view of the device of FIG. 1 along the line B-B'. This view shows in more detail the input waveguide 101 (noting that the structure of the input waveguide substantially matches that of the output waveguide 104). The input waveguide is formed of a slab region, and a ridge or rib region which extends away from the slab region in the 'y' direction. In this example the input waveguide is formed of silicon nitride, with a refractive index of around 2.2. Further, in this example, the slab has a height (as measured from an uppermost surface of the lower cladding layer 107 to an uppermost surface of the slab) of around 0.4 µm. The ridge or rib has a height of around 0.6 µm, so that the height of the waveguide including the ridge and slab is around 1 µm.

Figure 2C:
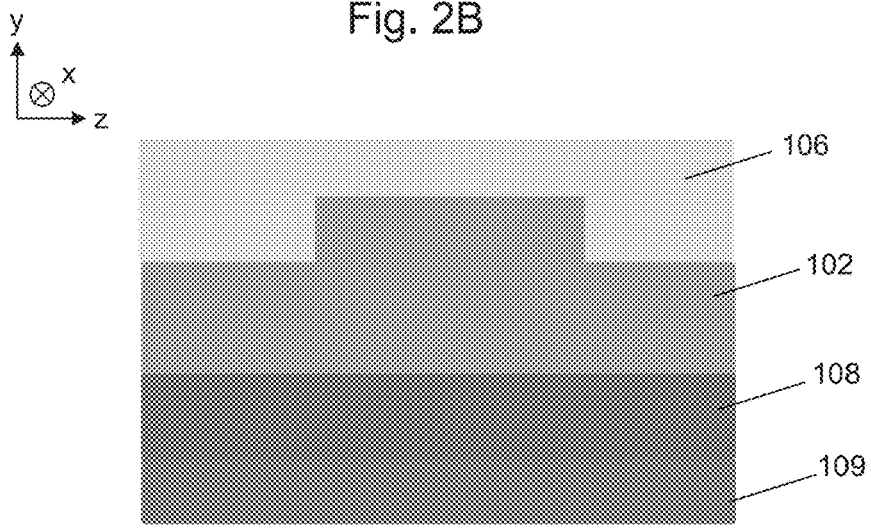
FIG. 2C is a cross-sectional view of the device of FIG. 1 along the line C-C'.

FIG. 2C is a cross-sectional view of the device of FIG. 1 along the line C-C'. This view shows in more detail the antireflective coating 102 located between the input waveguide and the multi-layered optically active stack (noting that the structure of this coating is substantially identical to that of the other antireflective coating between the stack and the output waveguide). The antireflective coating 103 substantially matches the input waveguide 101 in geometry, save that it does not extend as far in the 'x' direction. The antireflective coating in this example is formed of silicon nitride with a refractive index of around 2.8.

Figure 2D:
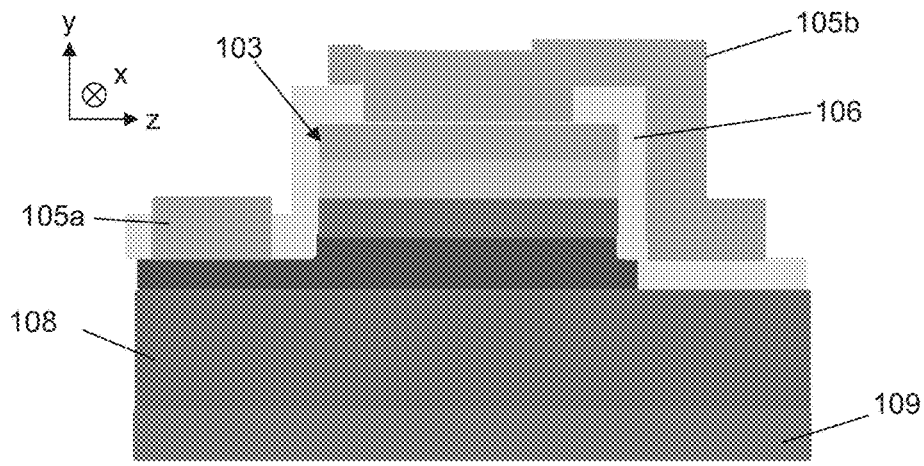
FIG. 2D is a cross-sectional view of the device of FIG. 1 along the line D-D'.

FIG. 2D is a cross-sectional view of the device of FIG. 1 along the line D-D'. This view shows in more detail the multi-layered optically active stack 103. As can be seen, the first electrode 105a extends through a via in the upper cladding layer 106 so as to electrically contact one layer of the multi-layered optically active stack. Similarly, the second electrode 105b extends up a sidewall of the stack, and through a second via in the upper cladding layer 106 so as to electrically contact a different layer of the multi-layered optically active stack.

Figure 3A:
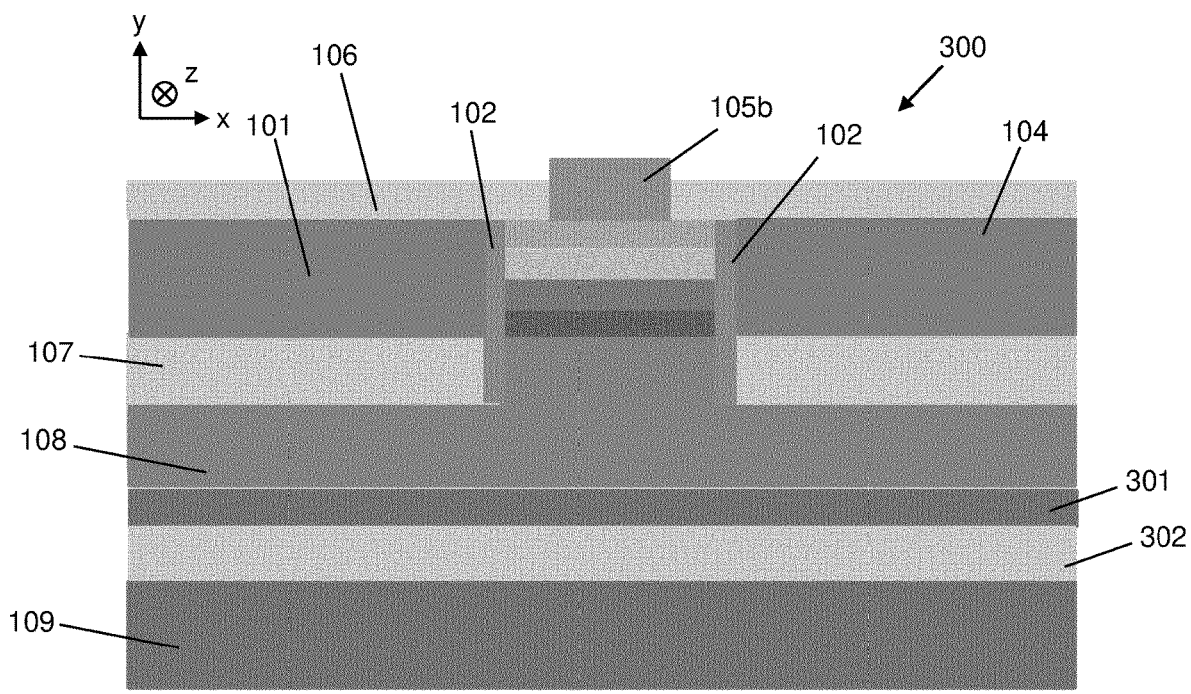
FIG. 3A is a cross-sectional view of a variation of the device of FIG. 1 along the line A-A'.
Figure 3B:
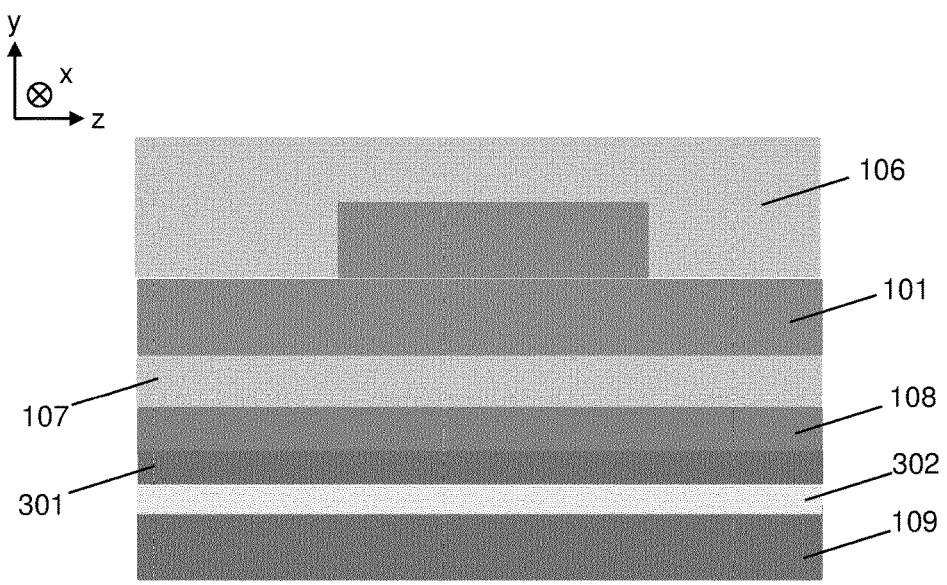
FIG. 3B is a cross-sectional view of a variation of the device of FIG. 1 along the line B-B'.
Figure 3C:
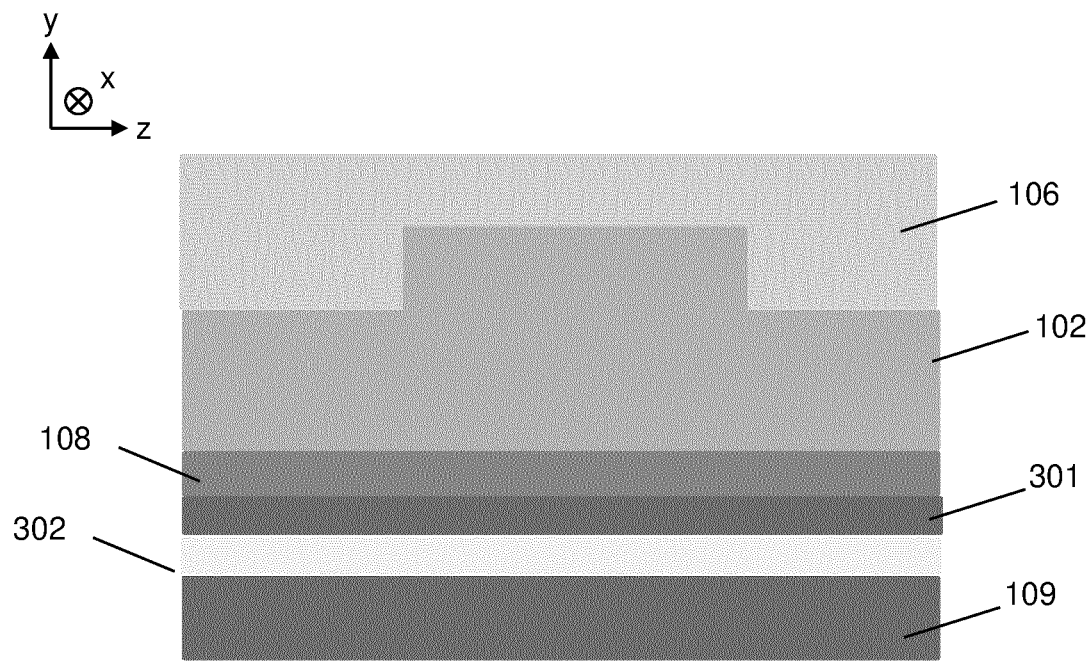
FIG. 3C is a cross-sectional view of a variation of the device of FIG. 1 along the line C-C'.
Figure 3D:
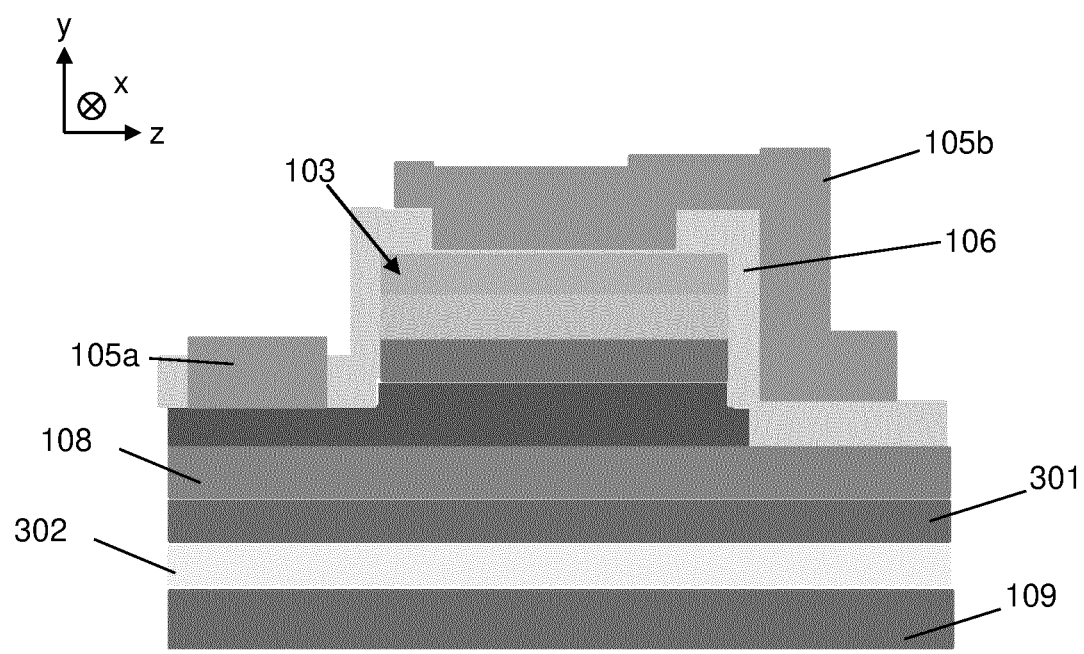
FIG. 3D is a cross-sectional view of a variation of the device of FIG. 1 along the line D-D'.

FIG. 3A is a cross-sectional view of a variation 300 of the device of FIG. 1 along the line A-A'. FIG. 3B is a cross-sectional view of the variant device 300 along the line B-B'. FIG. 3C is a cross-sectional view of the variant device 300 along the line C-C'. FIG. 3D is a cross-sectional view of the variant device 300 along the line D-D'.

Where the variant device 300 shown in FIGS. 3A-3D shares features with the device 100 shown previously, like features are indicated by like reference numerals. Chiefly, this device 300 differs in that the buffer layer 108 sits atop a silicon-on-insulator, or device, layer 301. This SOI layer is above a buried oxide layer 302, which is atop the silicon substrate 109.

Figure 4A:
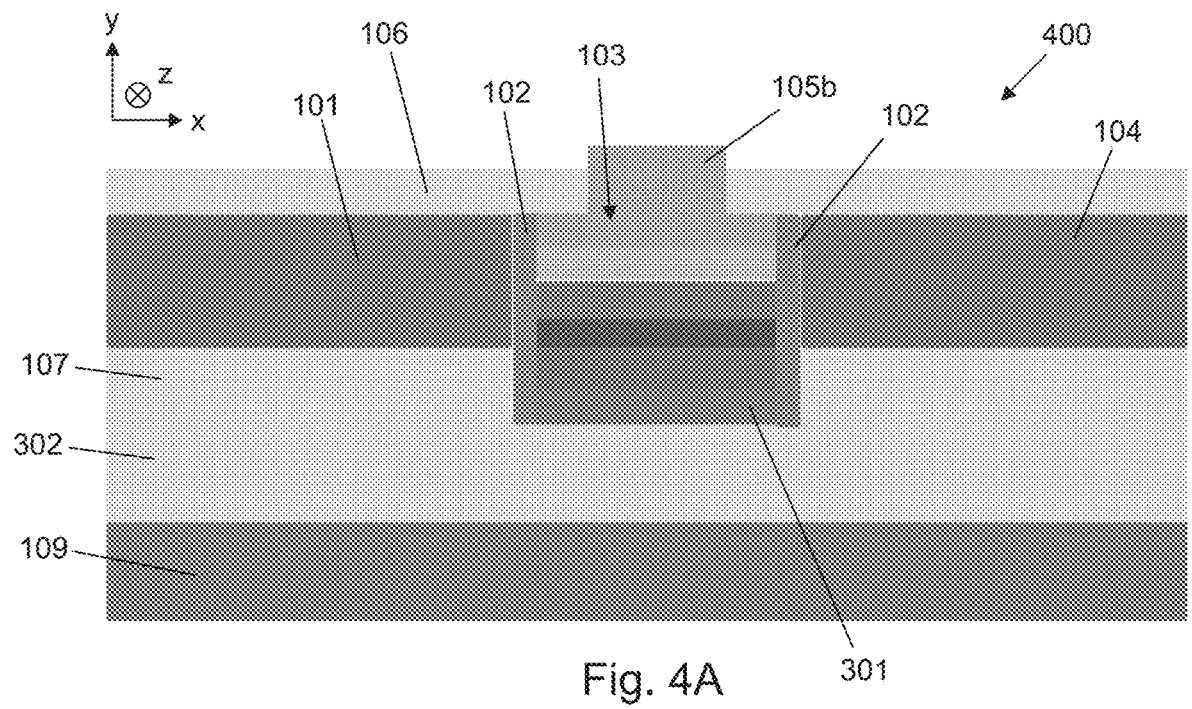
FIG. 4A is a cross-sectional view of a variation of the device of FIG. 1 along the line A-A'.
Figure 4B:
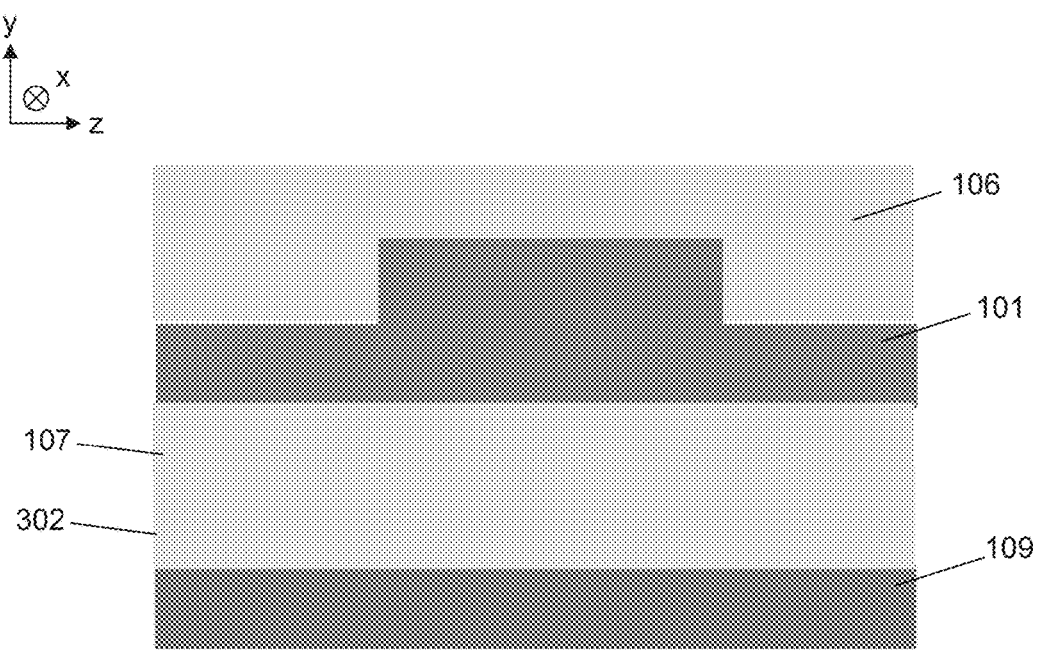
FIG. 4B is a cross-sectional view of a variation of the device of FIG. 1 along the line B-B'.
Figure 4C:
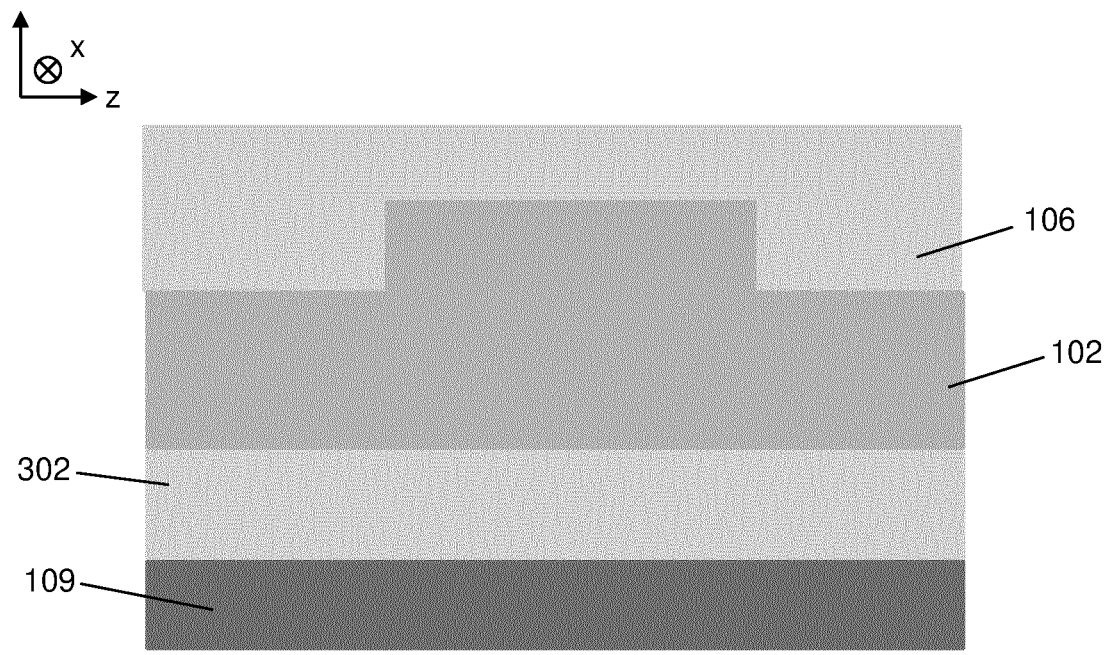
FIG. 4C is a cross-sectional view of a variation of the device of FIG. 1 along the line C-C'.
Figure 4D:
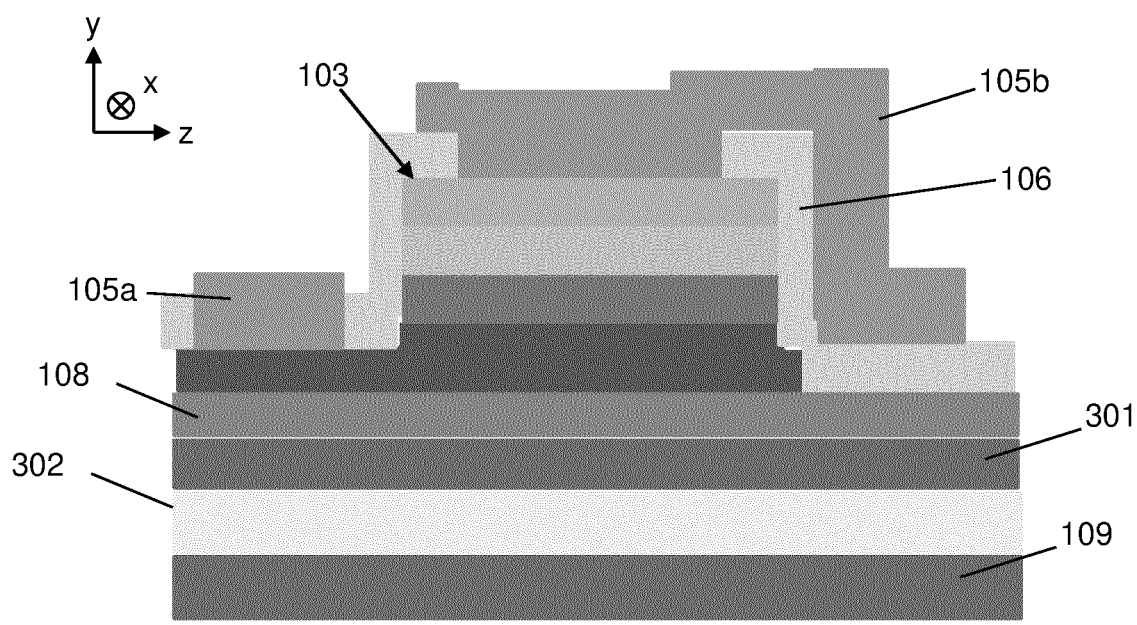
FIG. 4D is a cross-sectional view of a variation of the device of FIG. 1 along the line D-D'.

FIG. 4A is a cross-sectional view of a variation 400 of the device of FIG. 1 along the line A-A'. FIG. 4B is a cross-sectional view of the variant device 400 along the line B-B'. FIG. 4C is a cross-sectional view of the variant device 400 along the line C-C'. FIG. 4D is a cross-sectional view of a variation of the variant device 400 along the line D-D'.

Where the variant device 400 shown in FIGS. 4A-4D shares features with the device 100 shown previously, like features are indicated by like reference numerals. This device 400 differs in that the silicon device layer 301 has been selectively etched so as to confine it to the region between the antireflective coatings 102 only. The buried oxide layer 302 is therefore directly adjacent to the lower cladding layer 107.

Figure 5A:
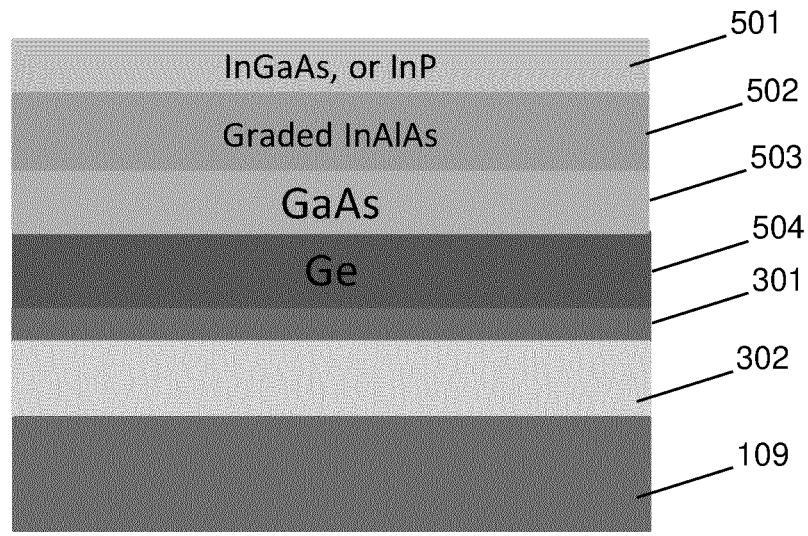
FIG. 5A is a schematic cross-section of a buffer region located above a silicon-on-insulator wafer.
Figure 5B:
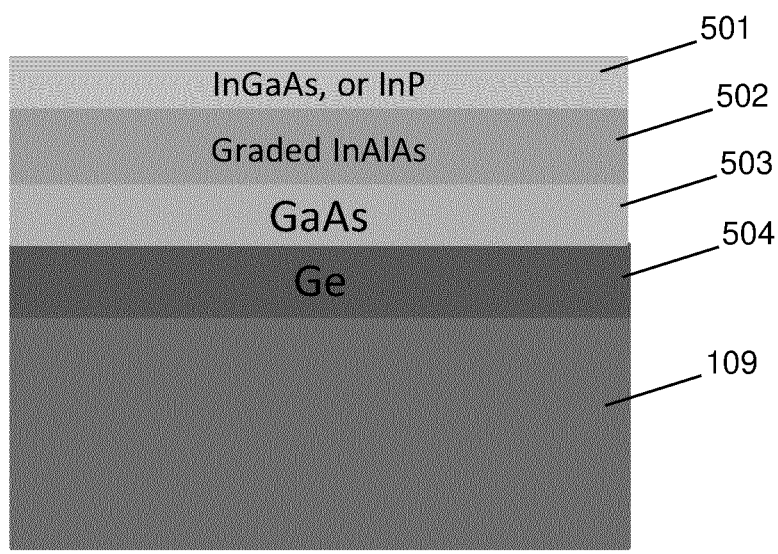
FIG. 5B is a schematic cross-section of the buffer region of FIG. 5A located above a silicon substrate.

FIG. 5A is a schematic cross-section of a buffer region located above a silicon-on-insulator wafer. As before, the 501 wafer comprises a silicon substrate 109, a buried oxide layer 302, and a silicon device layer 301. The buffer region in this example comprises the following layers, going from an uppermost layer down: an indium gallium arsenide (InGaAs) or indium phosphide (InP) layer 501; a graded indium aluminium arsenide ($In_xAl_{1-x}As$) layer 502 whose lattice constant linearly (or stepwisely) changes from that of GaAs to that of InP with x changing from around 0.03 to around 0.60 then back to around 0.52 at which the lattice constant of $In_xAl_{1-x}As$ approximately matches to that of InP; a gallium arsenide (GaAs) layer 503; and a germanium layer (Ge) 504. The combination of layers 501-504 may be referred to as the buffer region, or buffer layer in that together they function as a buffer layer for materials grown subsequently. FIG. 5B is a schematic cross-section of the buffer region of FIG. 5A located above a silicon substrate 109.

Figure 6A:
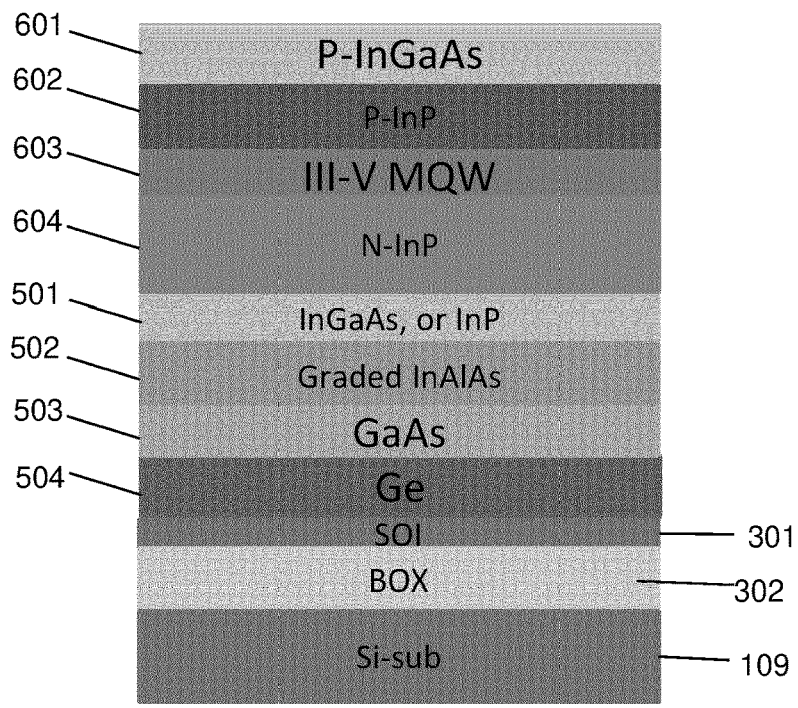
FIG. 6A is a schematic cross-section of the buffer region and SOI wafer of FIG. 5A and a multi-layered optically active stack including a multiple quantum well layer.
Figure 6B:
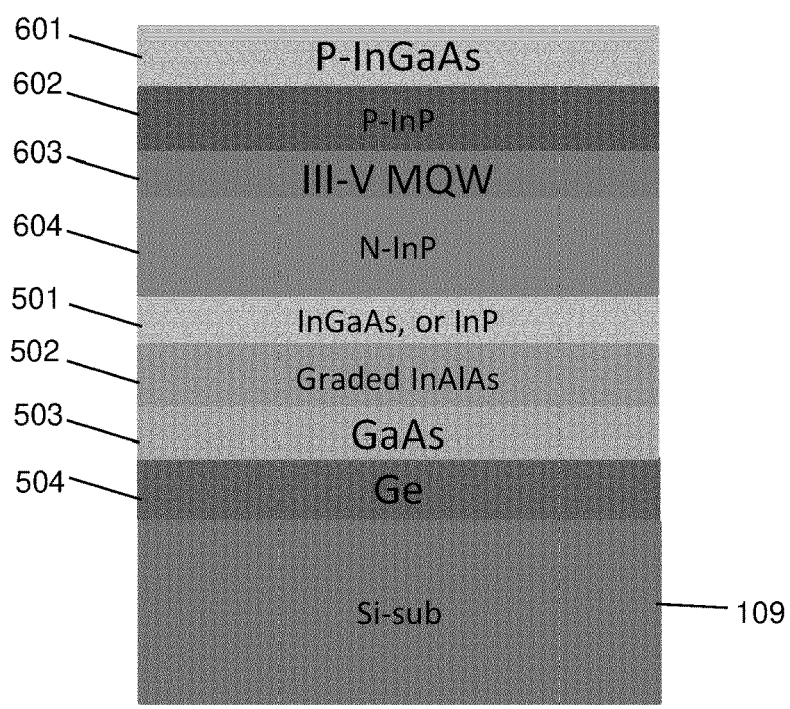
FIG. 6B is a schematic cross-section of the buffer region and substrate of FIG. 5B and a multi-layered optically active stack including a multiple quantum well layer.

FIG. 6A is a schematic cross-section of the buffer region 501-504 and SOI wafer of FIG. 5A and a multi-layered optically active stack including a multiple quantum well layer. The multi-layered optically active stack comprises the following layers, going from an uppermost layer down: a p-doped InGaAs layer 601; a p-doped InP layer 602; a III-V semiconductor based multiple quantum well layer 603; and an n-doped InP layer 604. FIG. 6B is a schematic cross-section of the buffer region and substrate of FIG. 5B and the multi-layered optically active stack including a multiple quantum well layer discussed with relation to FIG. 6A.

The multi-layered optically active stack in FIGS. 6A and 6B may have the following composition:

| Layer | R | n/u/p | Material | Thickness (nm) | Doping (1018) | Dopant |
|---|---|---|---|---|---|---|
| 18 | 1 | p | InGaAs | 400 | 1 | Zn |
| 17 | 1 | p | InGaAsP | 50 | 1.5 | Zn |
| 16 | 1 | p | InP | 1340 | 1 | Zn |
| 15 | 1 | p | InGaAsP | 20 | 1 | Zn |
| 14 | 1 | p | AlInGaAs | 60 | 1 | C |
| 13 | 1 | uid | AlInGaAs | 70 | | |
| 12 | 12x | uid | AlInGaAs | 7 | | |
| 11 | 12x | active | AlInGaAs | 9 | | |
| 10 | 1 | uid | AlInGaAs | 7 | | |
| 9 | 1 | uid | InGaAsP | 117 | | |
| 8 | 1 | n | InP | 80 | 0.2 | Si |
| 7 | 1 | n | InP | 70 | 0.5 | Si |
| 6 | 1 | n | InP | 920 | 0.8 | Si |
| 5 | 1 | uid | InGaAs or InP | 500 | | |
| 4 | 1 | uid | InAlAs | 1300 | | |
| 3 | 1 | uid | GaAs | 1000 | | |
| 2 | 1 | uid | Ge | 1000 | | |
| 1 | | | Si Substrate | | | |

Layers 2-5 form the buffer region or layer 108, and layer 4 is a graded buffer layer. R is the number of times that layer is repeated.

The multi-layered optically active stack in FIGS. 6A and 6B may have the following composition:

| Layer | R | n/u/p | Material | Thickness (nm) | Doping (1018) | Dopant |
|---|---|---|---|---|---|---|
| 12 | 1 | p | GaAs | 200 | 10 | Be |
| 11 | 1 | p | AlGaAs | 1500 | 1 | Be |
| 10 | 1 | uid | GaAs | 70 | | |
| 9 | 12x | uid | GaAsN | 10 | | |
| 8 | 12x | active | InGaNAs | 7 | | |
| 7 | 1 | uid | GaAsN | 10 | | |

-continued

| Layer | R | n/u/p | Material | Thickness (nm) | Doping (1018) | Dopant |
|---|---|---|---|---|---|---|
| 6 | 1 | uic | GaAs | 70 | | |
| 5 | | n | AlGaAs | 1500 | | Si |
| 4 | 1 | n | GaAs | 200 | | Si |
| 3 | 1 | uid | GaAs | 1000 | | |
| 2 | 1 | uid | Ge | 1000 | | |
| 1 | | | Si Substrate | | | |

In this example, layers 2 and 3 form the buffer region or buffer layer. R is the number of times that layer is repeated.

Figure 7A:
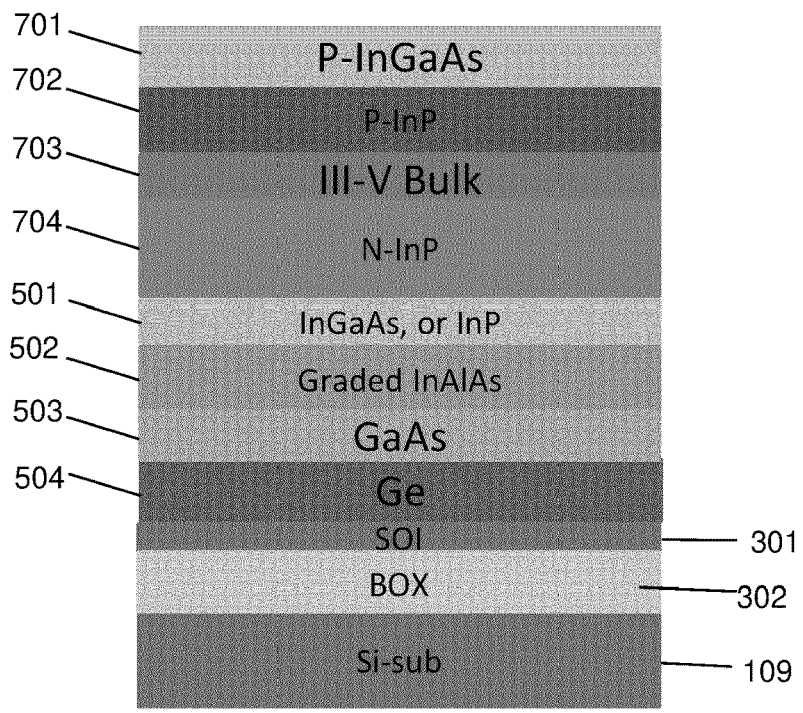
FIG. 7A is a schematic cross-section of the buffer region and SOI wafer of FIG. 5A and a multi-layered optically active stack including a bulk III-V layer.
Figure 7B:
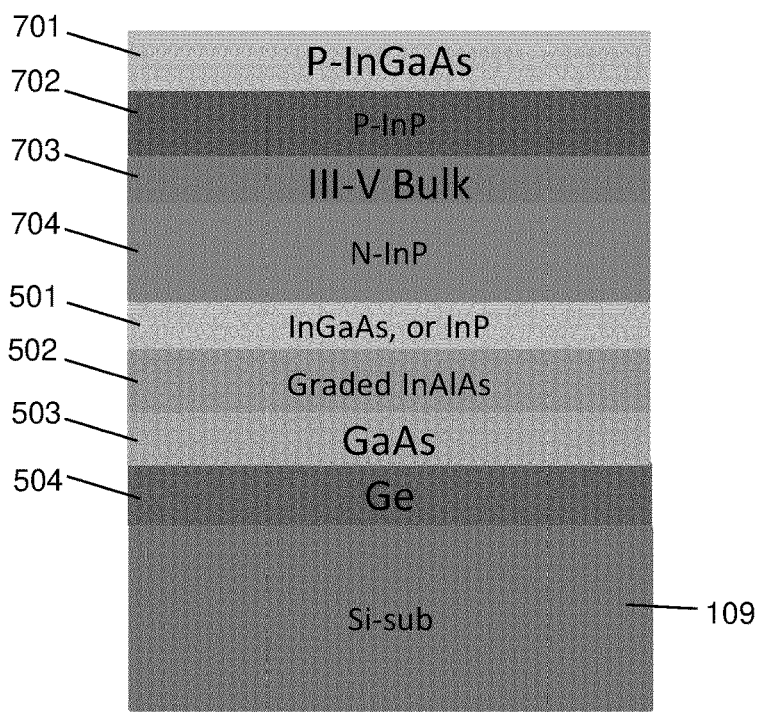
FIG. 7B is a schematic cross-section of the buffer region and substrate of FIG. 5B and a multi-layered optically active stack stack including a bulk III-V layer.

FIG. 7A is a schematic cross-section of the buffer region and SOI wafer of FIG. 5A and a variant multi-layered optically active stack including a bulk III-V layer. A bulk III-V layer may utilise the Franz-Keldysh effect, in comparison to the quantum confined Stark effect example, to make polarization independent electro-absorption modulators (EAM). The multi-layered optically active stack comprises the following layers, going from an uppermost layer down: a p-doped InGaAs layer 701; a p-doped InP layer 702; a III-V semiconductor based bulk layer 703; and an n-doped InP layer 704. FIG. 7B is a schematic cross-section of the buffer region and substrate of FIG. 5B and the variant multi-layered optically active stack.

The variant multi-layered optically active stack in FIGS. 7A and 7B may have the following composition:

| Layer | R | n/u/p | Material | Thickness (nm) | Doping (1018) | Dopant |
|---|---|---|---|---|---|---|
| 12 | 1 | p | InGaAs | 400 | 1 | Zn |
| 11 | 1 | p | InGaAsP | 50 | 1.5 | Zn |
| 10 | 1 | p | InP | 1340 | 1 | Zn |
| 9 | | uid | InGaAsP | 340 | | |
| 8 | | n | InP | 80 | 0.2 | Si |
| 7 | | C | InP | 70 | 0.5 | Si |
| 6 | 1 | n | InP | 920 | 0.8 | Si |
| 5 | | uid | InGaAs or InP | 500 | | |
| 4 | | uid | InAlAs | 1300 | | |
| 3 | 1 | uid | GaAs | 1000 | | |
| 2 | | uid | Ge | 1000 | | |
| 1 | | | Si Substrate | | | |

Layers 1-5 form the buffer region or buffer layer discussed previously. Layer 4, formed of InAlAs, is a graded buffer layer.

Figure 8A:
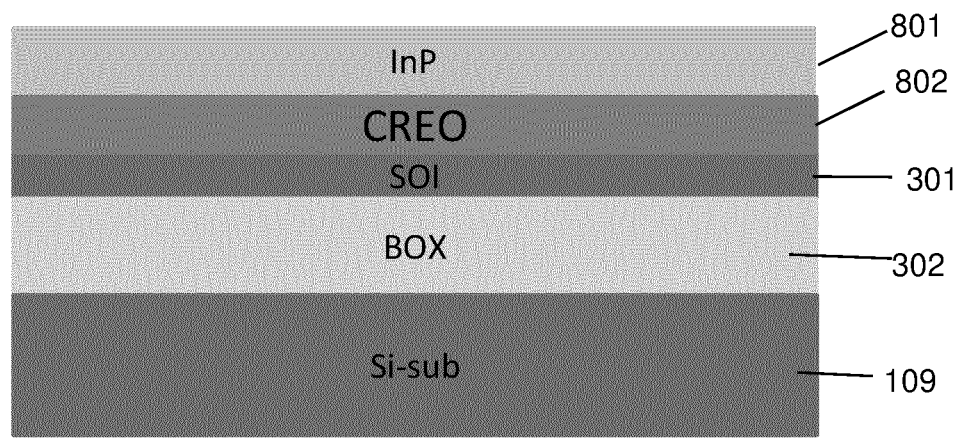
FIG. 8A is a schematic cross-section of a variant buffer region including a crystalline rare earth oxide layer above a SOI wafer.
Figure 8B:
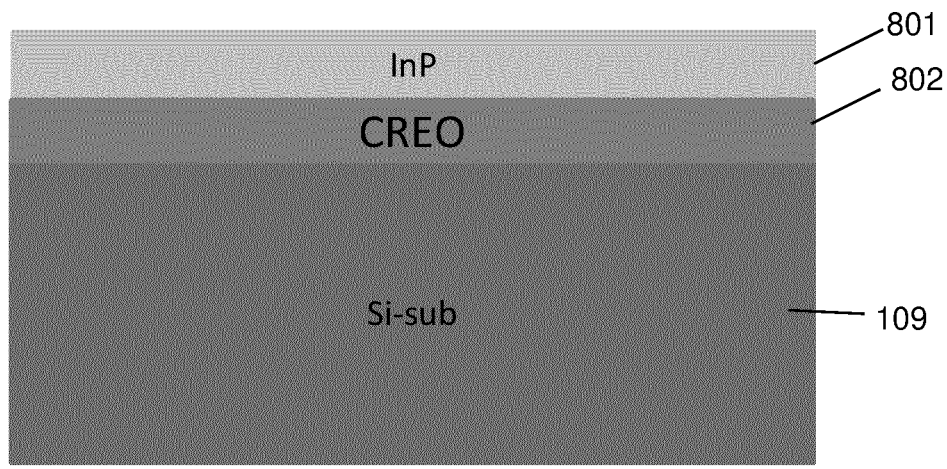
FIG. 8B is a schematic cross-section of the variant buffer region of FIG. 8A above a silicon substrate.

FIG. 8A is a schematic cross-section of a variant buffer region including a crystalline rare earth oxide layer above a SOI wafer. The variant buffer region comprises two layers: an indium phosphide layer 801 and a crystalline rare earth oxide (CREO) layer 802. The CREO layer is below the InP layer, and in this example adjacent to the silicon device layer 301. FIG. 8B is a schematic cross-section of the variant buffer region of FIG. 8A above a silicon substrate 109.

Figure 9A:
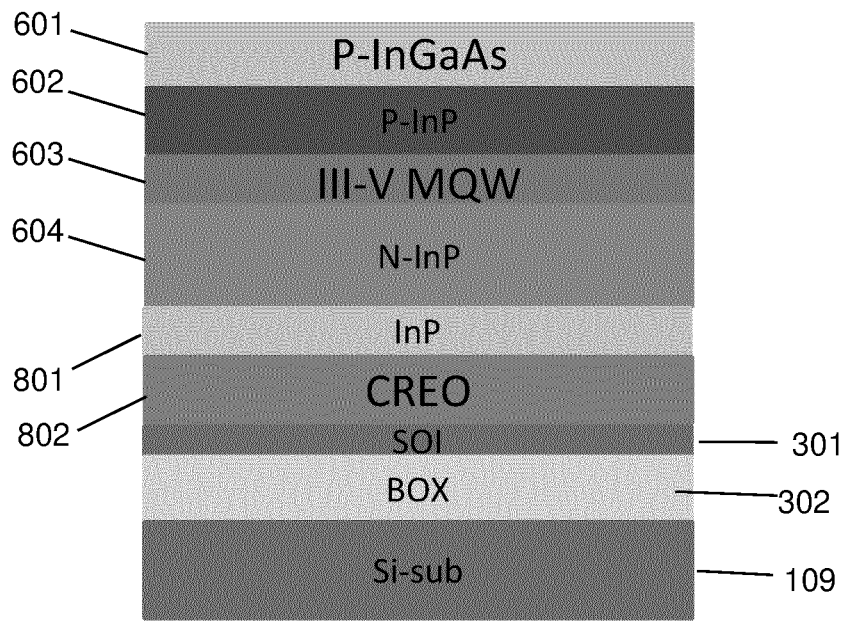
FIG. 9A is a schematic cross-section of the buffer region and SOI wafer of FIG. 8A and a multi-layered optically active stack including a multiple quantum well layer.
Figure 9B:
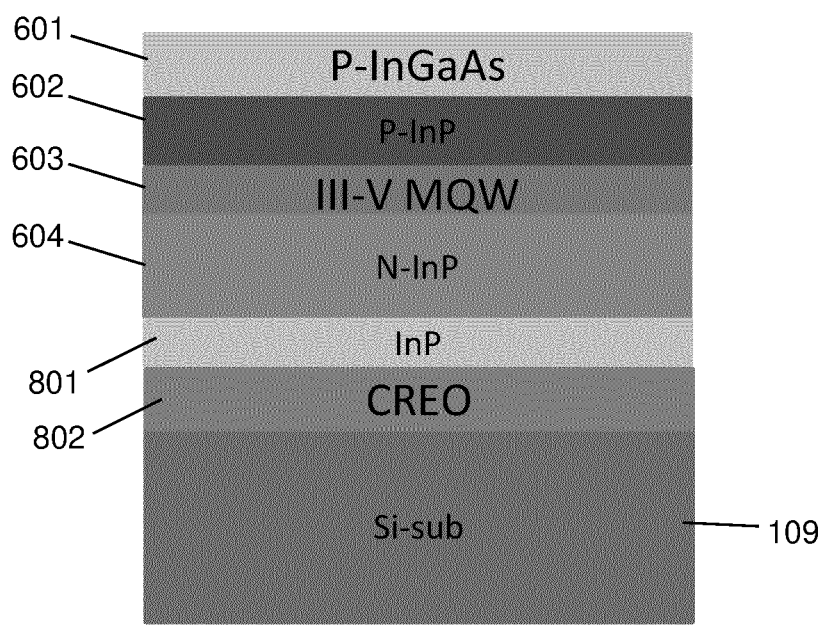
FIG. 9B is a schematic cross-section of the buffer region and substrate of FIG. 8B and a multi-layered optically active stack including a multiple quantum well layer.

FIG. 9A is a schematic cross-section of the buffer region and SOI wafer of FIG. 8A and the multi-layered optically active stack including layers 601 to 604. FIG. 9B is a schematic cross-section of the buffer region and substrate of FIG. 8B and the multi-layered optically active stack including layers 601 to 604.

The multi-layered optically active stack in FIGS. 9A and 9B may have the following composition:

| Layer | R | n/u/p | Material | Thickness (nm) | Doping (1018) | Dopant |
|---|---|---|---|---|---|---|
| 16 | 1 | P | InGaAs | 400 | 1 | Zn |
| 15 | 1 | P | InGaAsP | 50 | 1.5 | Zn |
| 14 | 1 | P | InP | 1340 | 1 | Zn |
| 13 | 1 | P | InGaAsP | 20 | 1 | Zn |
| 12 | 1 | P | AlInGaAs | 60 | 1 | C |
| 11 | 1 | Uid | AlInGaAs | 70 | | |
| 10 | 12x | Uid | AlInGaAs | 7 | | |
| 9 | 12x | Active | AlInGaAs | 9 | | |
| 8 | 1 | Uid | AlInGaAs | 7 | | |
| 7 | 1 | Uid | InGaAsP | 117 | | |
| 6 | 1 | N | InP | 80 | 0.2 | Si |
| 5 | 1 | N | InP | 70 | 0.5 | Si |
| 4 | 1 | N | InP | 920 | 0.8 | Si |
| 3 | 1 | Uid | InP | 200 | | |
| 2 | 1 | uid | CREO | 400-4000 | | |
| 1 | | | Si Substrate | | | |

Layers 2 and 3 form the buffer region or buffer layer referred to previously.

Figure 10A:
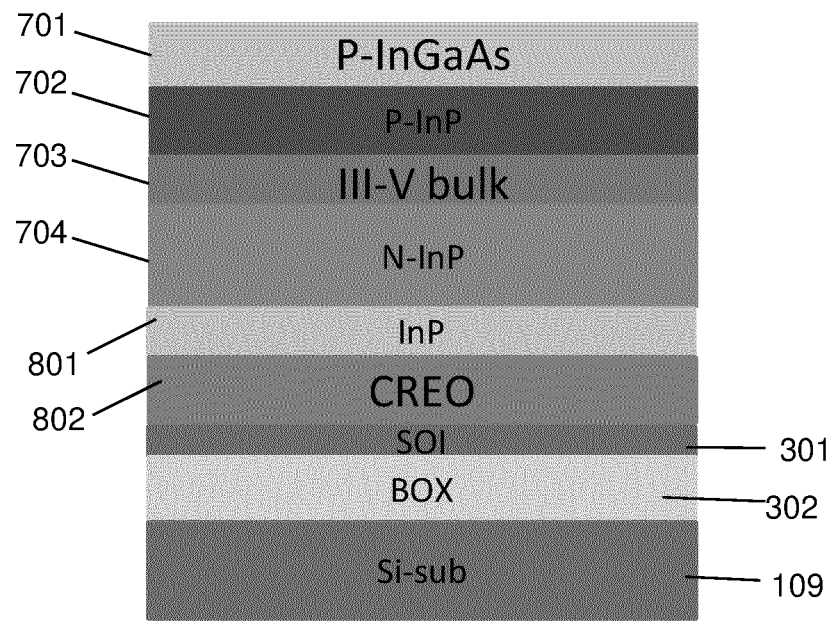
FIG. 10A is a schematic cross-section of the buffer region and SOI wafer of FIG. 8A and multi-layered optically active stack including a bulk III-V layer.
Figure 10B:
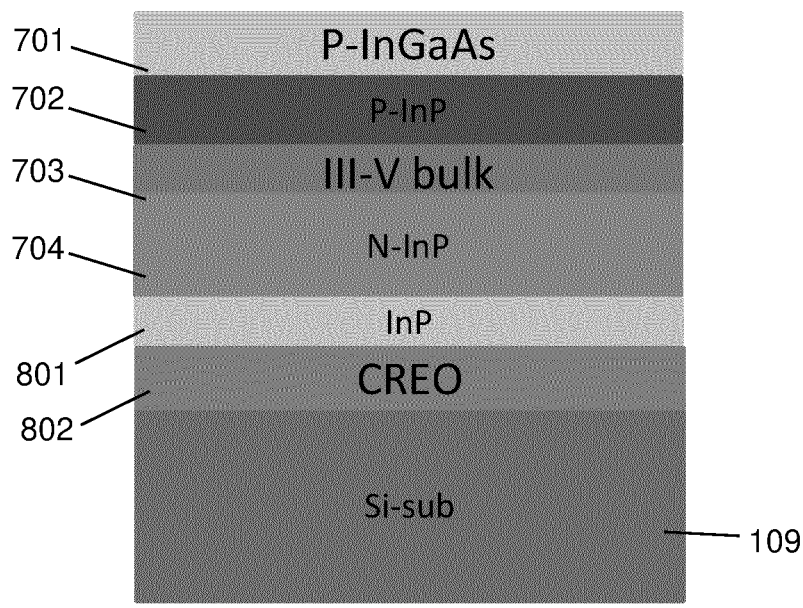
FIG. 10B is a schematic cross-section of the buffer region and substrate of FIG. 8B and multi-layered optically active stack including a bulk III-V layer.

FIG. 10A is a schematic cross-section of the buffer region and SOI wafer of FIG. 8A and the variant multi-layered optically active stack including layers 701-704. FIG. 10B is a schematic cross-section of the buffer region and substrate of FIG. 8B and the variant multi-layered optically active stack including layers 701-704.

The variant multi-layered optically active stack in FIGS. 9A and 9B may have the following composition:

| Layer | R | n/u/p | Material | Thickness (nm) | Doping (1018) | Dopant |
|---|---|---|---|---|---|---|
| 10 | 1 | P | InGaAs | 400 | 1 | Zn |
| 9 | 1 | P | InGaAsP | 50 | 1.5 | Zn |
| 8 | 1 | P | InP | 1340 | 1 | Zn |
| 7 | 1 | Uid | InGaAsP | 500 | | |
| 6 | 1 | N | InP | 80 | 0.2 | Si |
| 5 | 1 | N | InP | 70 | 0.5 | Si |
| 4 | 1 | N | InP | 920 | 0.8 | Si |
| 3 | 1 | Uid | InP | 200 | | |
| 2 | 1 | uid | CREO | 400-4000 | | |
| 1 | | | Si Substrate | | | |

Figure 11I:
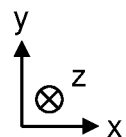
FIGS. 11(i)-11(xx')(B) show various manufacturing steps of a method of an embodiment of the present invention.
Figure 11I:
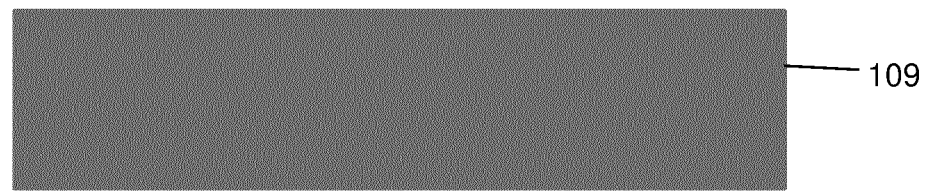
Figure 11:
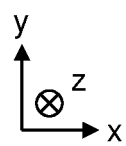
Figure 11:
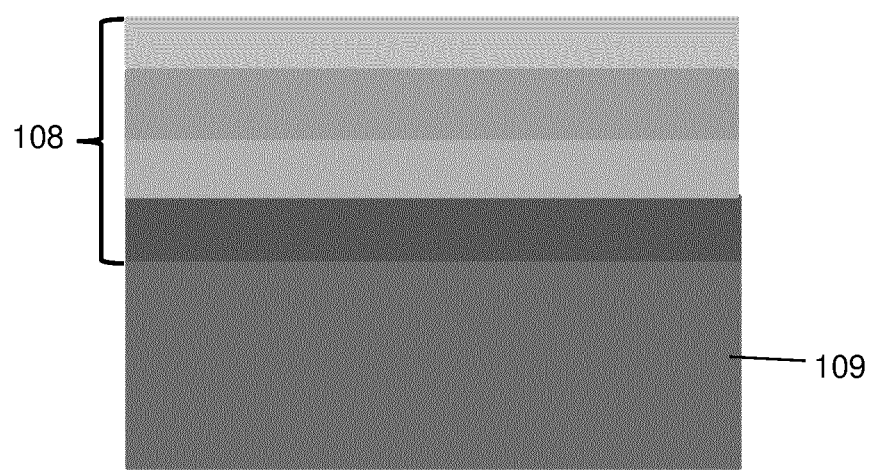
Figure 11:
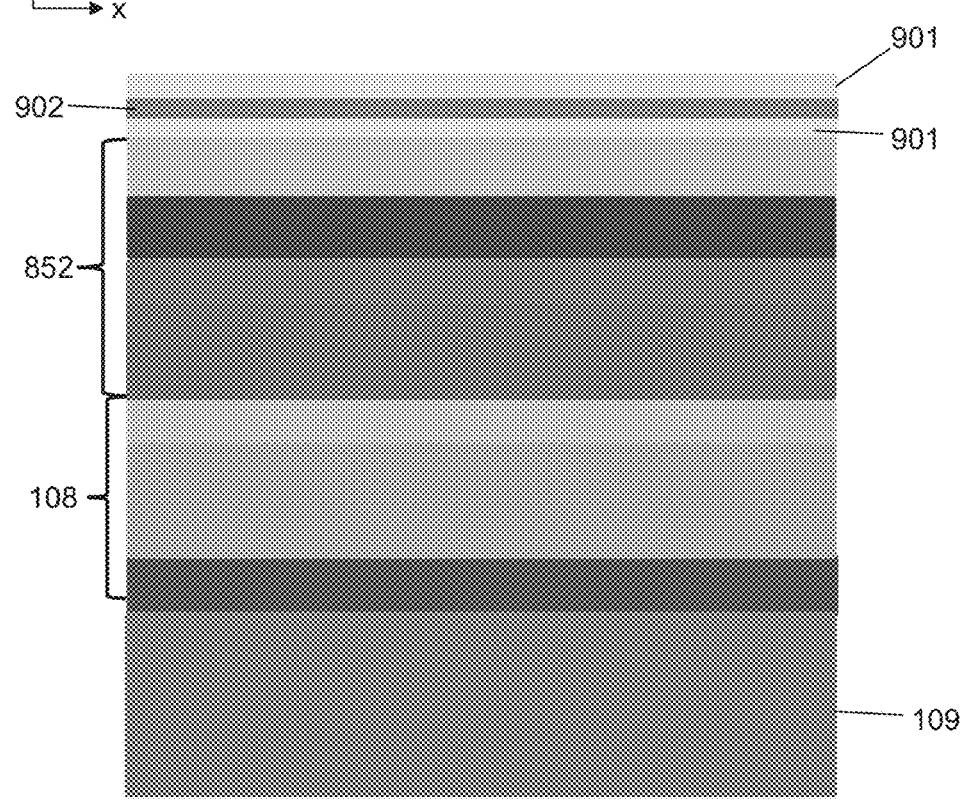
Figure 11:
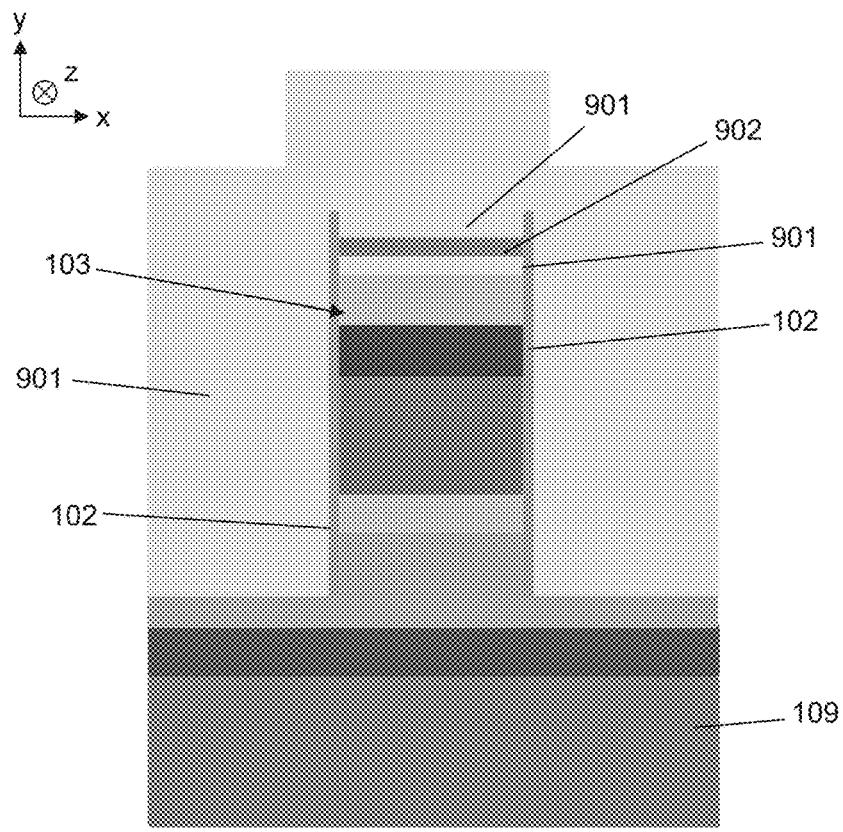
Figure 11X:
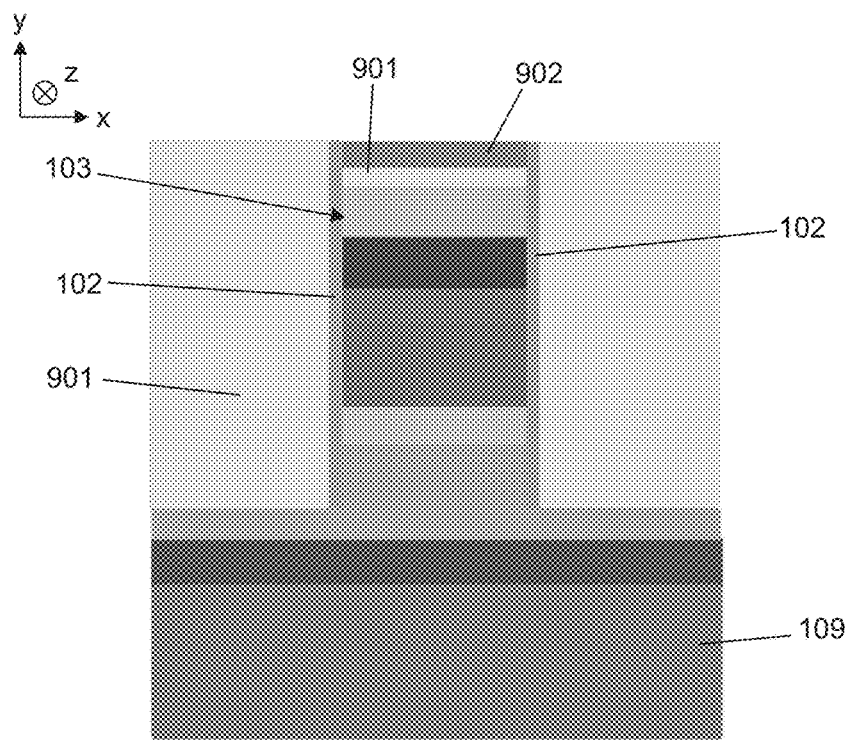
Figure 11:
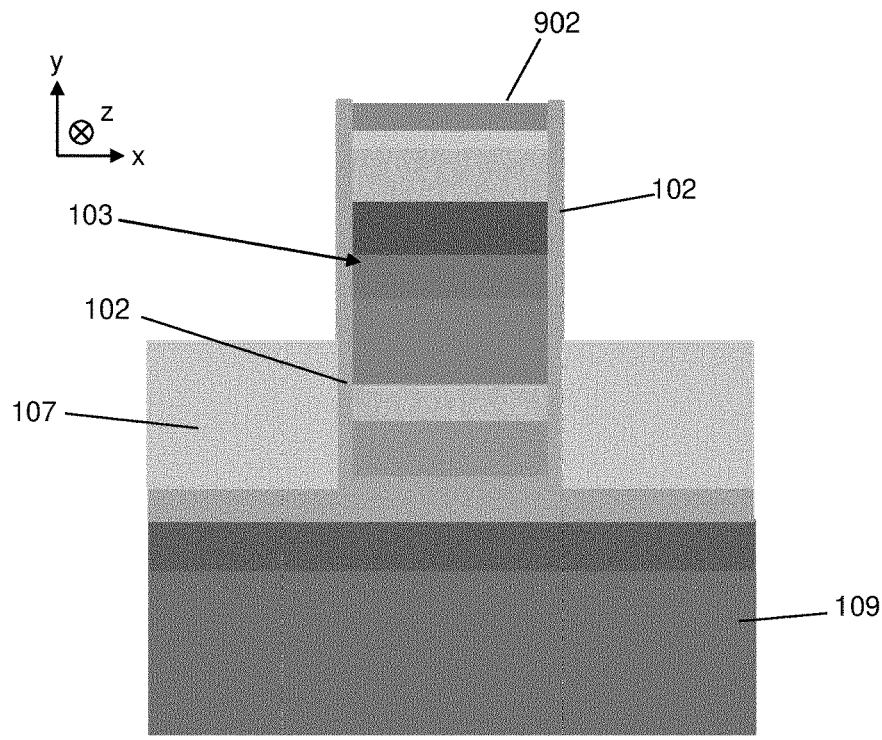
Figure 11:
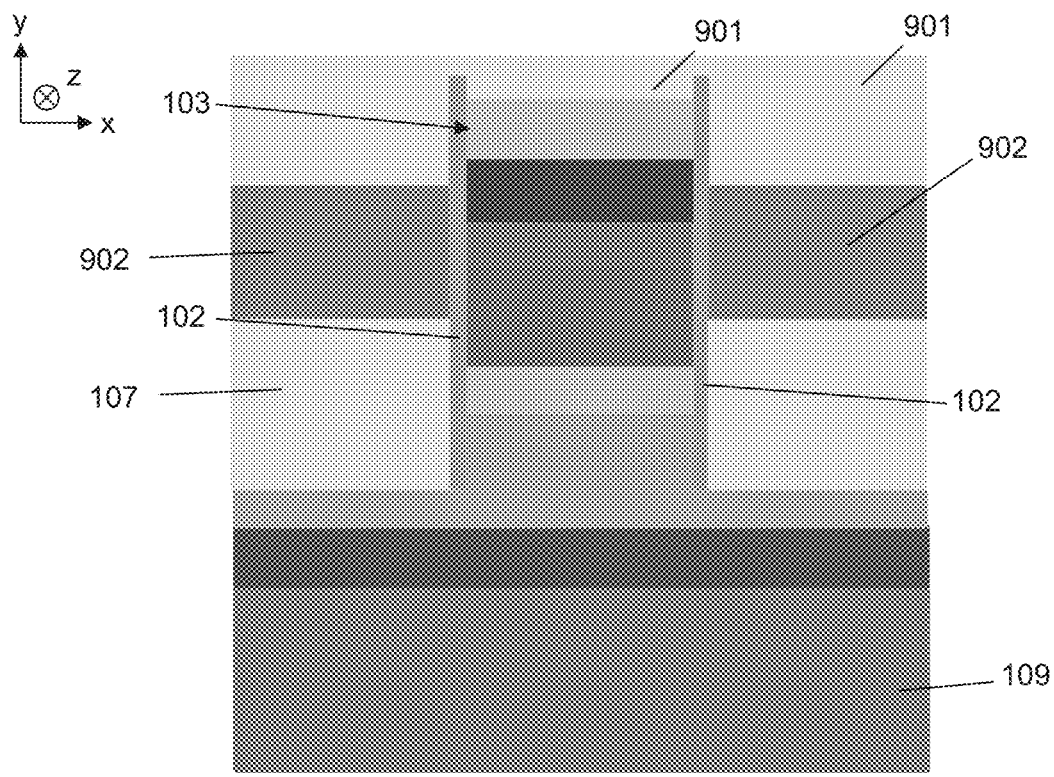
Figure 11:
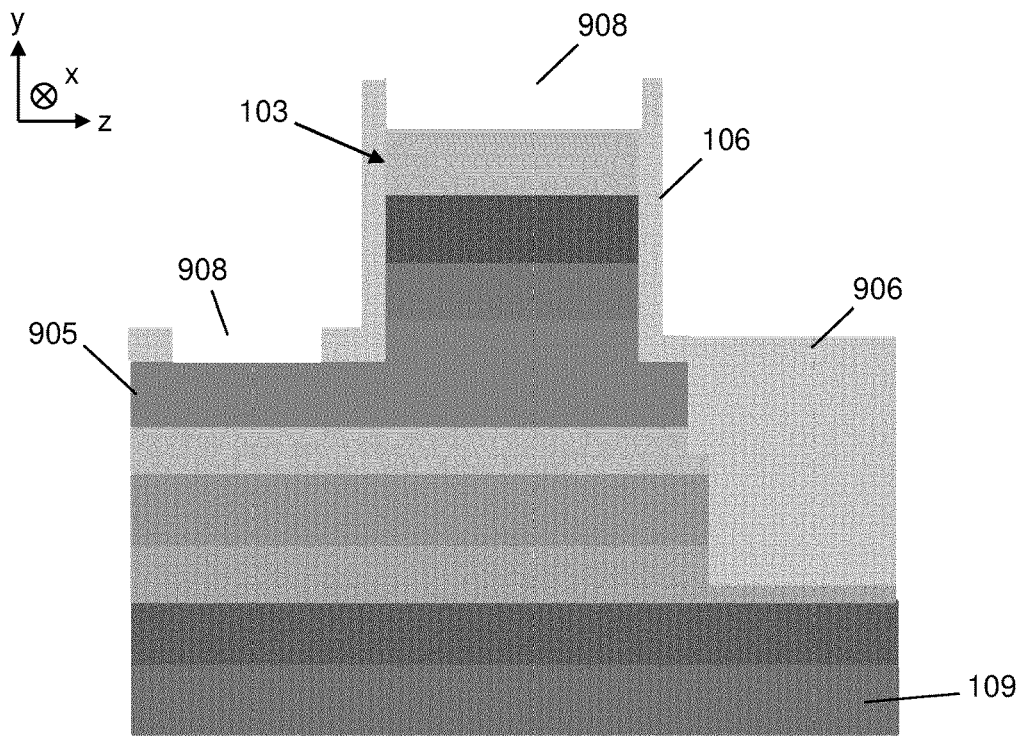
Figure 11:
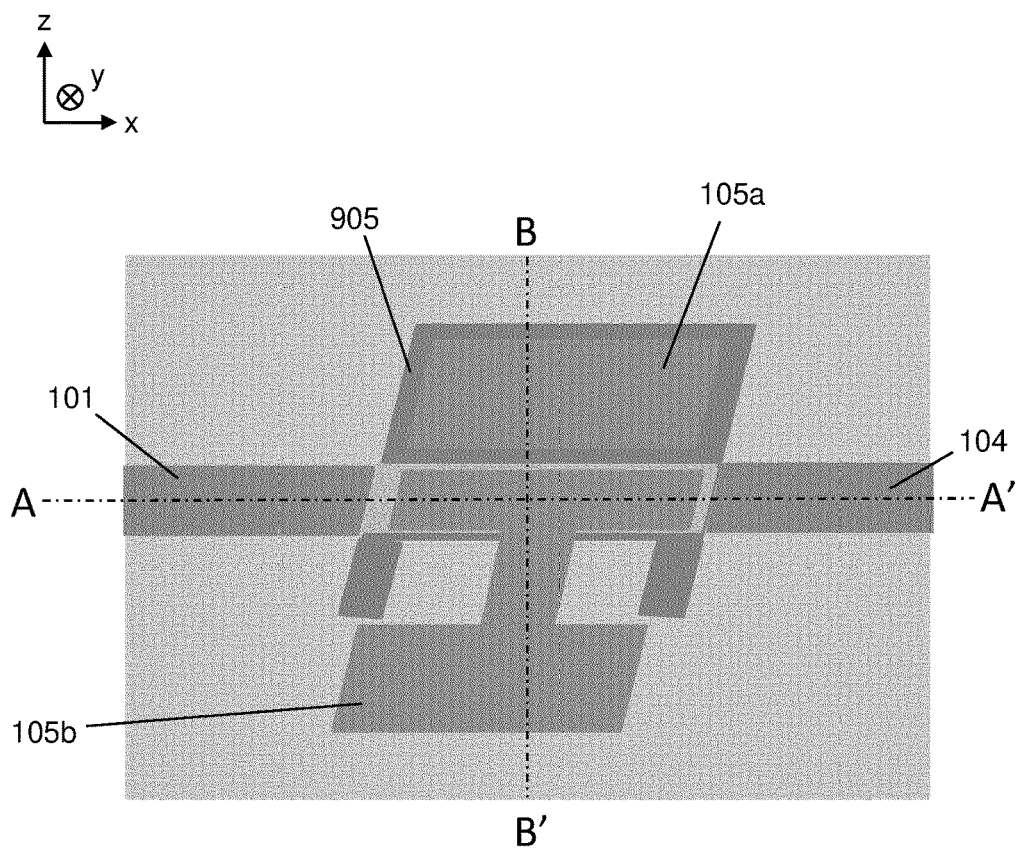
Figure 11:
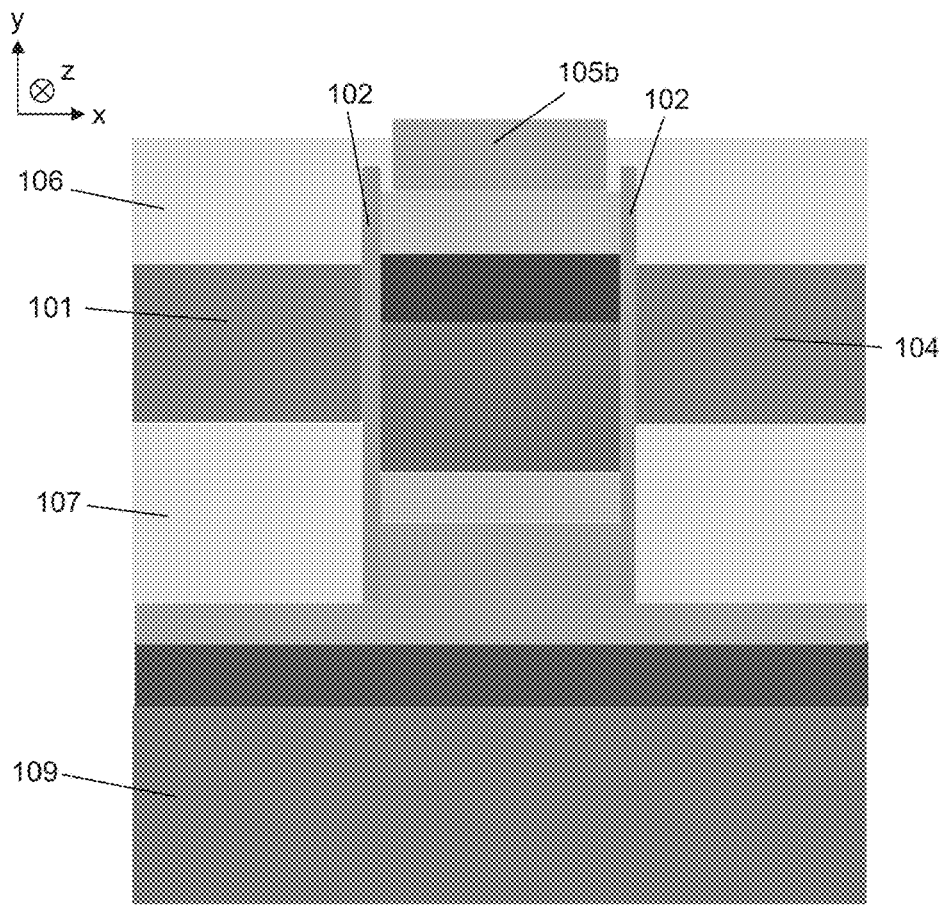
Figure 11:
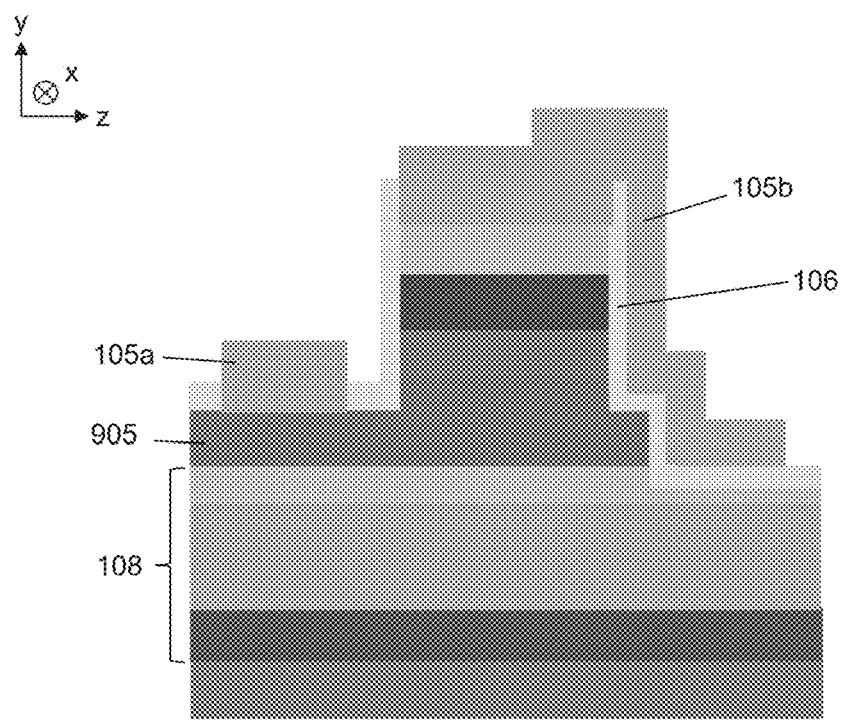

FIGS. 11(i)-11(xx')(B) show various manufacturing steps of a method of an embodiment of the present invention. Whilst the multi-layered optically active stack, buffer region, and platform (i.e. substrate) shown in FIGS. 11(i)-11(xx')(B) substantially match those shown in FIG. 6B, any of the multi-layered optically active stacks, buffer regions or buffer layers, or platforms shown herein may be substituted. That is to say, the manufacturing steps shown are applicable to any of the buffer types, multi-layered optically active stacks, and platforms disclosed herein.

In a first step, shown in FIG. 11(i), a silicon substrate 109 is provided. If the platform shown, for example, in FIG. 5A were used, an SOI wafer would be provided. Next, in a step shown in FIG. 11(ii) a buffer region or buffer layer 108 is epitaxially grown from the exposed upper surface of the silicon substrate. Subsequently, in a step shown in FIG. 11(iii) a multi-layered optically active region 852 is epitaxially grown from an exposed upper surface of the buffer region 108. Next, a silicon dioxide layer 901, a silicon nitride 902, and a further silicon dioxide 901 layer are deposited, in that order, atop the exposed upper surface of the multi-layered optically active region 852. The result of this is shown in FIG. 11(iv).

Next, in a step shown in FIG. 11(v)(A), a photoresist 903 is deposited and patterned so as to define the multi-layered optically active stack 103. FIG. 11(v)(B) shows the same step from a top-down perspective in a first example, and 11(v')(B) shows a variation of the step in a second example. In both examples, lateral sides of the photoresist are at an angle α relative to the 'z' direction. The angle α in this example has a value of around 8°. In the first example, the patterned photoresist 903 has a parallelogramal geometry. In the second example, a gap is made in a part of the photoresist, so that the photoresist has the form of an inverted 'U' shape.

After provision of the photoresist, an etch is performed down to either a GaAs layer of the buffer region or a graded InAlAs layer of the buffer region, depending on the buffer region thickness and the subsequent lower cladding 107 thickness. Typically the input and output waveguides should encounter no optical loss caused by the lower cladding thickness. The result of this etch is shown in FIG. 11(*vi*)(A) in cross-section, whereby the multi-layered optically active stack 103 has now been defined. FIG. 11(*vi*)(B) shows the same step in the first example from a top-down view, and Figure (vi')(B) the same step in the second example from a top-down view. In both examples, the upper silicon dioxide layer 901 has been omitted for clarity.

Next, in a step shown in FIG. 11(*vii*), a silicon rich silicon nitride antireflective coating layer 102 is deposited on all exposed surfaces of the device. As shown in the figure, the antireflective coating is present not only on the sidewalls of the multi-layered optically active stack 103 but also on the upper surface of the upper silicon dioxide layer 901 and also the upper surface of the exposed buffer region. An anisotropic etching process is then used, to remove all of the antireflective coating asides from those portions 102 on the sidewalls of the multi-layered optically active stack 103. The result of this anisotropic etching process is shown in FIG. 11(viii).

Subsequently, in a step shown in FIG. 11(*ix*), further silicon dioxide 901 is deposited over the device. The deposition provides a silicon dioxide 901 region which extends entirely around the antireflective coating 102 and multi-layered optically active stack 103. In the second example referred to in FIG. 11(*vi'*)(B), this step also provides an isolation pad 906 discussed in more detail below. Next, in a step shown in FIG. 11(*x*), a chemical-mechanical planarization (CMP) process is performed such that an uppermost surface of the silicon dioxide 910 region is aligned with an uppermost surface of the upper silicon nitride layer 902. Notably, this includes removing the upper silicon dioxide layer shown previously.

After this CMP process, a further etch is performed to such that the silicon dioxide region provides the lower cladding 107. The height of the etch is dependent on the mode centre of the subsequently formed input/output waveguides and also the multi-layered optically active stack 103. The result of further etch is shown in FIG. 11(*xi*).

After the further etching step, in a step shown in FIG. 11(*xii*), silicon nitride 902 is deposited in the same manner as the silicon dioxide. That is, the deposition provides a silicon nitride region 902 which extends entirely around exposed areas of the antireflective coating 102 and multi-layered optically active stack 103. Next, in a step shown in FIG. 11(xiii), a CMP process is used to align an uppermost surface of the silicon nitride region 902 with an uppermost surface of the lower silicon dioxide layer 901. Notably, this includes the removal of the silicon nitride layer 902 referred to previously. After the CMP process, a further etch is performed such that the height of the input and/or output waveguides is defined. The height of the etch is chosen so as to maximise the coupling efficiency between the input and/or output waveguides and the multi-layered optically active stack. The result of this etch is shown in FIG. 11(*xiv*).

After the silicon nitride 902 regions have been etched, further silicon dioxide 901 is deposited over device and then planarized. This is shown in FIG. 11(*xv*).

Next, the multi-layered optically active stack is partially etched on either side of a core region down to a doped layer to form an optically active stack waveguide, and the input and output waveguides are also partially etched to form ridge or rib with self-alignment. FIG. 11(*xvi*) shows the photoresist 903 used for this etching step, and FIGS. 11(xvii) (A) and (B) are cross-sections along the lines A-A' and B-B' respectively. Notably, as shown in FIG. 11(xvii)(B), the etch is performed so that an upper surface of a doped layer 905 of the multi-layered optically active stack is exposed. In this example, it is the n doped indium phosphide layer. FIGS. 11(xvii) (D) and (E) show the input waveguide and the antireflection layer cross sections along the lines C-C' and DD' in FIG. 11(xvii)(C) in the input side of the optically active stack waveguide, and the same cross sections are also in the output side of the optically active stack waveguide.

Alternatively, in the second example discussed with reference to FIG. 11(*vi'*)(B), the multi-layered optically stack is partially etched on one side of a core region down to the doped layer 905. This is shown in FIG. 11(xvii') and 11(xvii')(A)-(B) which are cross-sections along the lines A-A' and B-B'. As is shown in FIG. 11(xvii')(B), the etch is performed such that an upper surface of the doped layer 905 on one side of the multi-layered optically active stack is exposed. On the other side, the isolation pad 906 provided previously acts as an etch stop. A small region of doped layer 905 may be exposed on the same side as the isolation pad 906.

FIGS. 11(xviii) and 11(xviii)(A)-(B) show a step which is performed only for the first example, and is skipped in the second example. In this step further silicon dioxide is provided, which defines the upper cladding layer 106. An etch is then performed through this silicon dioxide and also through the doped layer 905 and partially into a then exposed layer 907 of the buffer region. The result of this etch is most clearly shown in FIG. 11(xviii)(B), a cross-section along the line B-B' shown in FIG. 11(xviii).

In either example, a step of depositing further silicon dioxide and etching one or more vias 908 is performed. This is shown in FIGS. 11(*xix*) and 11(*xix*)(A)-(B). As is shown most clearly in FIG. 11(*xix*)(A) and 11(*xix*)(B), which are respective cross-sections along the lines A-A' and B-B' of FIG. 11(*xix*), one via 908 is formed above an uppermost layer of the multi-layered optically active stack 103 and another via 908s is formed above the doped layer 905. FIG. 11(*xix*)(B) is a cross-section for the first example, and FIG. 11(xix')(B) is a cross-section for the second example.

After the vias 908 are provided, a metallization process is performed to provide the first and second electrodes 105a and 105b discussed previously. FIG. 11(xx) shows the result of this metallization process from a top-down view. FIG. 11(xx)(A) is a cross-section along the line A-A' of FIG. 11(xx). FIG. 11(xx)(B) is a cross-section along the line B-B' of FIG. 11(xx) for the first example, and FIG. 11(xx')(B) is a cross-section along the line B-B' of FIG. 11(xx) for the second example.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting.

Various changes to the described embodiments may be made without departing from the spirit and scope of the invention.

LIST OF FEATURES 100, 300, 400 Optoelectronic device
101 Input waveguide
102 Antireflective coating
103 Multi-layered optically active stack
104 Output waveguide
105a,b Electrode
106 Upper cladding
107 Lower cladding
108 Buffer layer
109 Substrate
301 SOI layer
302 Buried oxide layer
501-504 Buffer layers
601-604 III-V semiconductor stack layers
701-704 III-V semiconductor stack layers
801-802 Buffer layers
852 Multi-layered optically active region
901 $SiO_2$
902 SiN
903 Photoresist
905 Doped layer of multi-layered optically active stack
906 Isolation pad
907 Exposed layer of the buffer region
908 Via

The invention claimed is:

1. An optoelectronic device comprising:
a multi-layered optically active stack, including one or more layers comprising a III-V semiconductor material;
an input waveguide, arranged to guide light into the multi-layered optically active stack; and
an output waveguide, arranged to guide light out of the multi-layered optically active stack;
wherein the multi-layered optically active stack is butt or edge coupled to the input waveguide and output waveguide,
wherein the optoelectronic device further comprises:
a first anti-reflective coating located between the input waveguide and the multi-layered optically active stack; and
a second anti-reflective coating, located between the output waveguide and the multi-layered optically active stack, and wherein the output waveguide is directly adjacent to the second anti-reflective coating and the second anti-reflective coating is directly adjacent to the multi-layered optically active stack, and
wherein:
the first and/or the second anti-reflective coating(s) is formed of a composition of silicon nitride with a refractive index which is greater than a refractive index of a silicon nitride core layer of either the input waveguide or the output waveguide; or
a refractive index of the first and/or the second anti-reflective coating is at least 2.6 and no more than 2.85; or
the first and/or the second anti-reflective coating have respective lengths, as measured parallel to a guiding direction of the input waveguide, of at least 90 nm and no more than 200 nm.

2. The optoelectronic device of claim 1, wherein the input waveguide and the output waveguide are formed from silicon nitride.

3. The optoelectronic device of claim 1, wherein the input waveguide is directly adjacent to the first anti-reflective coating and the first anti-reflective coating is directly adjacent to the multi-layered optically active stack.

4. The optoelectronic device of claim 1, wherein the first and/or the second anti-reflective coating(s) is formed of a composition of silicon nitride with a refractive index which is greater than a refractive index of a silicon nitride core layer of either the input waveguide or the output waveguide.

5. The optoelectronic device of claim 1, wherein a refractive index of the first and/or the second anti-reflective coating is at least 2.6 and no more than 2.85.

6. The optoelectronic device of claim 1, wherein the first and/or the second anti-reflective coating have respective lengths, as measured parallel to a guiding direction of the input waveguide, of at least 90 nm and no more than 200 nm.

7. The optoelectronic device of claim 1, wherein the multi-layered optically active stack is directly adjacent to the input waveguide and the output waveguide.

8. The optoelectronic device of claim 1, wherein a refractive index of a core layer of the input waveguide and the output waveguide is at least 1.9 and no more than 2.35.

9. The optoelectronic device of claim 1, wherein the multi-layered optically active stack includes a graded layer of III-V semiconductor material.

10. The optoelectronic device of claim 1, wherein the multi-layered optically active stack includes a multiple quantum well layer formed from a III-V semiconductor material.

11. The optoelectronic device of claim 1, wherein the multi-layered optically active stack includes a buffer region and an optically active region.

12. The optoelectronic device of claim 11, wherein the buffer region includes a crystalline rare earth oxide layer.

13. The optoelectronic device of claim 1, further comprising an oxide cladding layer, said oxide cladding layer being located directly between the input waveguide and either a buffer layer or a buried oxide layer.

14. A method of forming an optoelectronic device, comprising the steps of:
(a) blanket growing a multi-layered optically active region on a substrate, wherein the multi-layered optically active region includes one or more layers formed of a III-V semiconductor material;
(b) patterning and etching the multi-layered optically active region so as to provide a multi-layered optically active stack; and
(c) depositing an input waveguide and output waveguide adjacent to the multi-layered optically active stack, arranged so as to butt or edge couple the input waveguide and the output waveguide to the multi-layered optically active stack,
wherein the method further comprises a step, between steps (b) and (c), of depositing an anti-reflective coating around at least a part of the multi-layered optically active stack,
wherein the method further comprises, after depositing the anti-reflective coating, a step of etching the anti-reflective coating, and
wherein the anti-reflective coating is formed of a composition of silicon nitride with a refractive index which is greater than a refractive index of a silicon nitride core layer of either the input waveguide or the output waveguide.

15. The method of claim 14, wherein the input waveguide and output waveguide are formed of silicon nitride.

16. The method of claim 14, further comprising, after etching the anti-reflective coating, a step of depositing bulk insulator onto the device.

* * * * *